(12) United States Patent
Laski

(10) Patent No.: US 7,054,717 B2
(45) Date of Patent: May 30, 2006

(54) ROBOTIC WASH CELL USING RECYCLED PURE WATER

(75) Inventor: Stephen J. Laski, Howell, MI (US)

(73) Assignee: ABB Inc., Auburn Hills, MI (US)

( * ) Notice: Subject to any disclaimer, the term of this patent is extended or adjusted under 35 U.S.C. 154(b) by 0 days.

(21) Appl. No.: 10/926,855

(22) Filed: Aug. 26, 2004

(65) Prior Publication Data
US 2005/0051198 A1    Mar. 10, 2005

Related U.S. Application Data

(62) Division of application No. 10/271,517, filed on Oct. 16, 2002, now Pat. No. 6,804,579.

(51) Int. Cl.
*G06F 19/00* (2006.01)
(52) U.S. Cl. .................. 700/245; 318/568.15; 342/418
(58) Field of Classification Search ................ 700/245, 700/256, 258, 259, 247; 318/568.11, 568.12, 318/568.16, 587; 342/418, 457; 356/237.2, 356/446
See application file for complete search history.

(56) References Cited

U.S. PATENT DOCUMENTS

| | | | |
|---|---|---|---|
| 3,971,394 A | 7/1976 | Osborne | 134/104 |
| 4,029,114 A | 6/1977 | Wiltrout | 134/104 |
| 4,220,170 A | 9/1980 | Hebert et al. | 134/167 |
| 4,629,409 A | 12/1986 | Satoh et al. | 425/139 |
| 4,652,368 A | 3/1987 | Ennis et al. | 210/97 |
| 4,817,653 A | 4/1989 | Krajicek et al. | 134/168 |
| 4,850,382 A | 7/1989 | Williams | 134/167 |
| 5,038,809 A | 8/1991 | Rodgers et al. | 134/111 |
| 5,059,332 A | 10/1991 | Satoh | 210/771 |
| 5,065,703 A | 11/1991 | Lee | 122/382 |
| 5,127,363 A | 7/1992 | Nakamura et al. | 118/695 |
| 5,248,341 A | 9/1993 | Berry, Jr. et al. | 118/698 |
| 5,358,568 A | 10/1994 | Okano et al. | 118/323 |
| 5,454,533 A | 10/1995 | Grant et al. | 244/134 |
| 5,501,741 A | 3/1996 | McMahon | 134/13 |
| 5,593,598 A | 1/1997 | McGinness et al. | 210/748 |

(Continued)

OTHER PUBLICATIONS

Zaki et al., Spray painting of a general three-dimensional surface, 2000, IEEE, p. 2172-2177 vol. 3.*

*Primary Examiner*—Yonel Beaulieu
*Assistant Examiner*—McDieuenel Marc
(74) *Attorney, Agent, or Firm*—Jeffrey S. Sokol; Cook & Franke S.C.

(57) ABSTRACT

The present invention pertains to a robotic wash cell including a six-axis robotic arm and end effector equipped with nozzles that spray unheated, solvent free, pure water at high-pressure to clean or deburr objects by maintaining the nozzles in close proximity and substantially normal to each surface being cleaned or edge being deburred. The robotic cell wash is particularly useful for cleaning contaminants such as oil and grease from items having more complex shapes. The six-axis robotic arm positions the nozzles and their sprays substantially normal to each surface being cleaned or deburred. The nozzles produce a multi-zone spray pattern with a continuous effective cleaning zone. A water recycling and pressurizing system collects the used water, separates out the oil and grease contaminants to a level of about 5 ppm, and pressurizes the pure water to about 3,000 psi for washing operations or about 6,000 psi for deburring operations.

8 Claims, 12 Drawing Sheets

U.S. PATENT DOCUMENTS

| | | | |
|---|---|---|---|
| 5,605,487 A * | 2/1997 | Hileman et al. | 451/5 |
| 5,665,245 A | 9/1997 | Kloss et al. | 210/744 |
| 5,878,952 A * | 3/1999 | Powell | 239/1 |
| 5,979,794 A | 11/1999 | DeFillipi et al. | 239/135 |
| RE36,465 E | 12/1999 | Boisture | 134/22.1 |
| 6,164,561 A | 12/2000 | Yoshida et al. | 239/223 |
| 6,301,930 B1 * | 10/2001 | Warner et al. | 65/27 |
| 6,315,648 B1 * | 11/2001 | Neer | 451/92 |
| 6,350,177 B1 * | 2/2002 | Gonzalez-Martin et al. | 451/41 |
| RE37,674 E | 4/2002 | Carter | 134/104.4 |
| 6,368,183 B1 * | 4/2002 | Trojan et al. | 451/8 |
| 6,402,855 B1 | 6/2002 | Damron et al. | 134/10 |

* cited by examiner

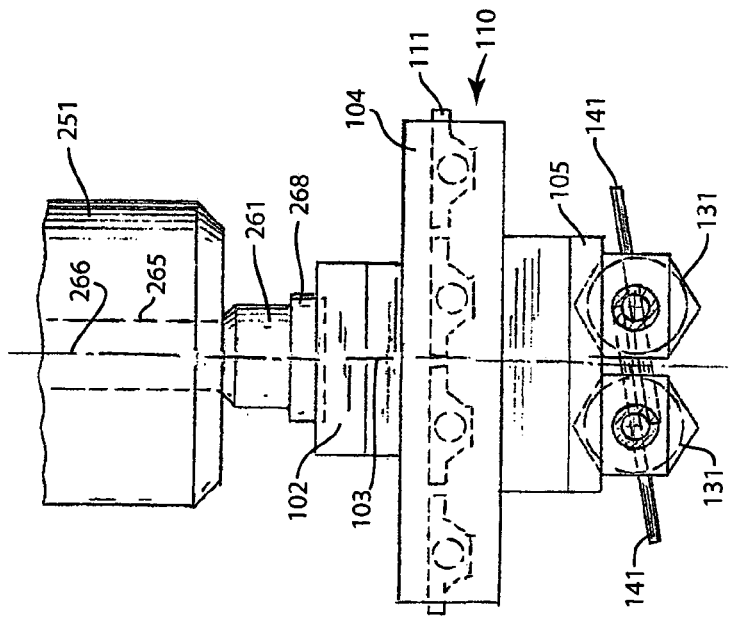
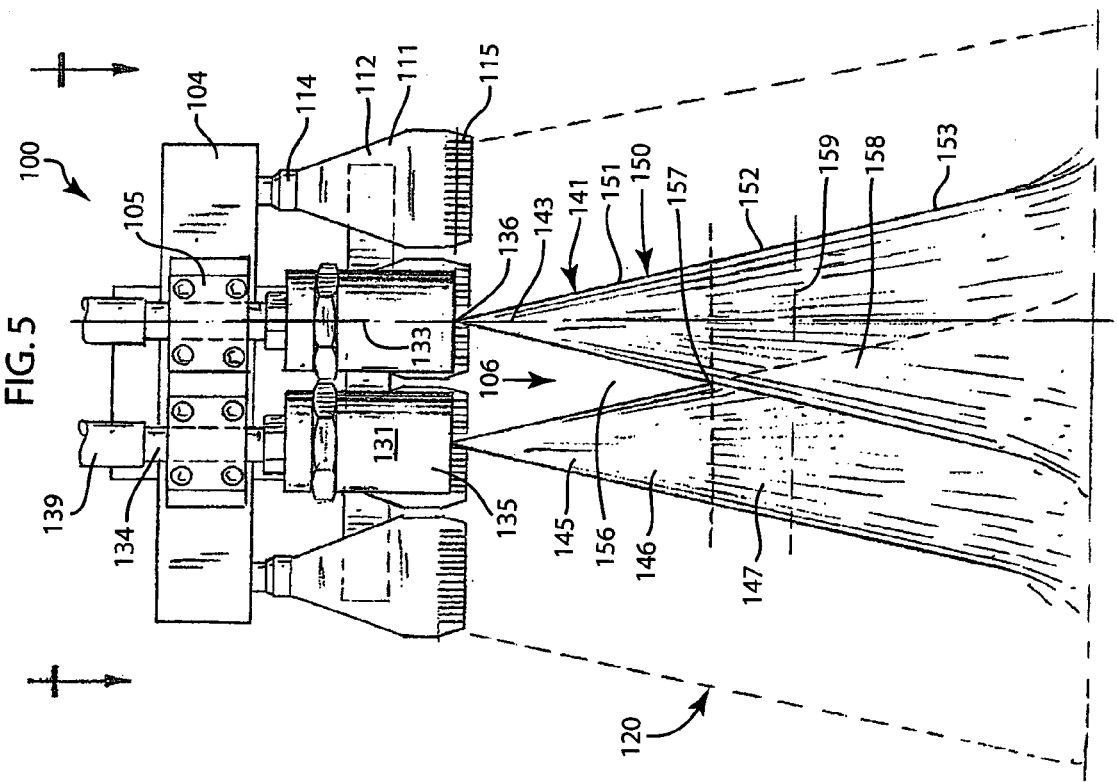

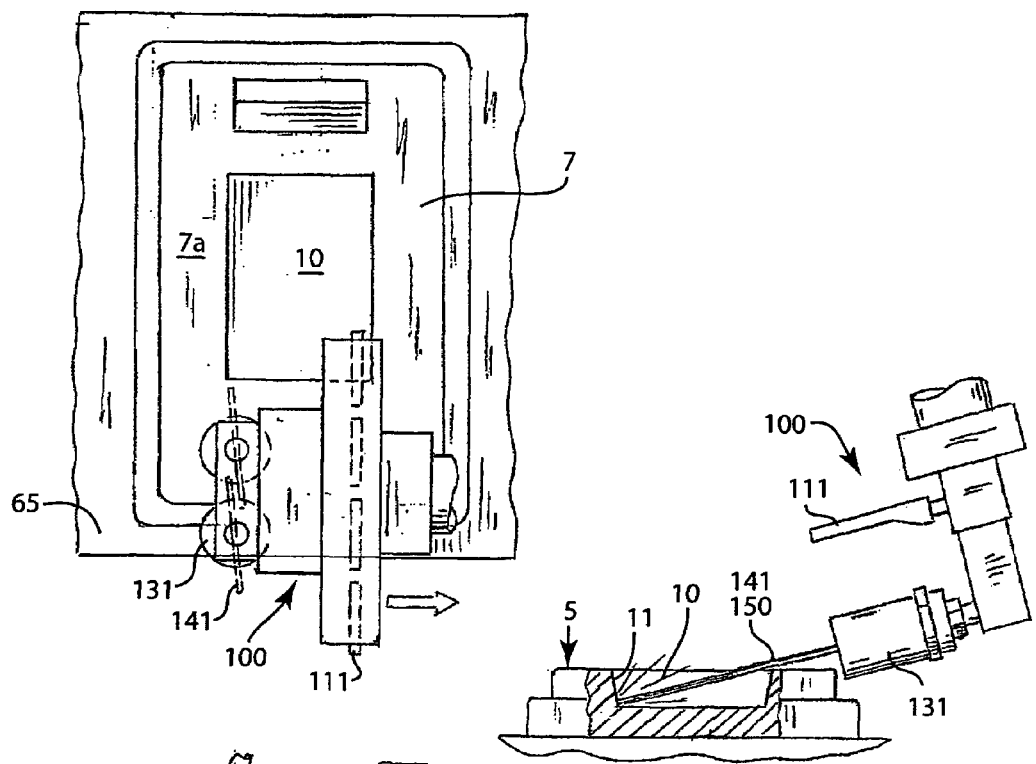
FIG. 10
FIG. 12
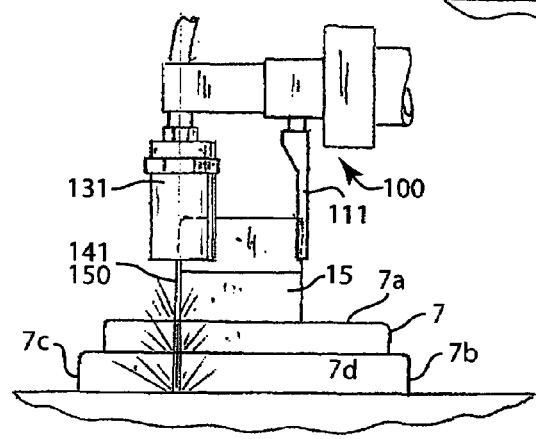
FIG. 11

ROBOTIC WASH CELL USING RECYCLED PURE WATER

This patent application is a divisional application from parent U.S. patent application Ser. No. 10/271,517 filed on Oct. 16, 2002 now U.S. Pat. No. 6,804,579.

TECHNICAL FIELD OF THE INVENTION

The present invention relates to a robotic wash cell using a recycled, pure water system that includes a six-axis robotic arm and end effector equipped with nozzles that spray unheated, solvent free, high-pressure water to clean oil films from or debur an object by maintaining the nozzles in close proximity and substantially normal to each surface being cleaned or edge being deburred.

BACKGROUND OF THE INVENTION

Various factors affect the design of a robotic wash system. These factors include the size, shape and texture of the object or item being cleaned, the material or contaminant being removed, and whether the working fluid is recycled, contains a cleaning solvent or is heated. Robotic wash systems for small and mid size objects, such as cars, car body carriers and painting masks frequently use a wash cell or booth that encloses the item and wash system. Larger objects such as airplanes, ship cargo holds and storage tanks, frequently require a portable robot that is brought to or placed inside the object being cleaned. Some systems are designed to remove paint from the surface of the item while others are designed to remove a contaminant such as oil or grease. Some criteria allow the spray to slightly erode the item while others do not. Examples of various robotic washing and cleaning devices are discussed and shown in U.S. Pat. No. 4,817,653 to Krajicek, U.S. Pat. No. 5,038,809 to Rodgers, U.S. Pat. No. 5,358,568 to Okano, U.S. Pat. No. 5,248,341 to Berry and U.S. Pat. No. 5,454,533 to Grant, the disclosures of which are incorporated by reference herein.

Robotic wash systems include a variety of components. They typically include a robotic device and corresponding control system, a working fluid for washing the object, a pump to pressurize the fluid, nozzles to spray the fluid at the object, and an end effector or frame to support the nozzles. Detergents or other chemical solvents are usually added to the wash spray to improve cleaning effectiveness. The wash system can include a closed room or cell that contains the robotic arm, object being cleaned and working fluid spray. Wash cells help prevent work related injuries and accidents that can arise due to inadvertent contact with the rapidly moving robotic arm or its heated, pressurized spray. Wash cells also help contain the spray and its chemical that enter the air in the form of a mist or increased humidity. This helps maintain the manufacturing plant and its air supply in a desirable condition. Some examples of wash cells are described in U.S. Pat. No. 4,220,170 to Hebert, U.S. Pat. No. 4,629,409 to Satoh and U.S. Pat. No. 4,850,382 to Williams, the disclosures of which are incorporated by reference herein.

Wash systems are often designed to recycle the working fluid after it is sprayed. The sprayed fluid is typically collected and passed through one or more filters or separators to remove the contaminants and debris. Examples of some conventional recycling wash systems are described in U.S. Pat. No. 4,029,114 to Wiltrout, U.S. Pat. No. 4,652,368 to Ermis, U.S. Pat. No. 5,059,332 to Satoh, U.S. Pat. No. 5,501,741 to McMahon, U.S. Pat. No. 5,593,598 to McGinness, U.S. Pat. No. 5,665,245 to Kloss, U.S. Pat. No. 6,402,855 to Damron and U.S. Pat. No. RE 37,674 to Carter, the disclosures of which are incorporated herein.

Conventional robotic wash systems have difficulties cleaning contaminants such as oil and grease from an object, particularly when the working fluid is being recycled. Oil and grease can leave a thin film on the surface of the object even after it is washed. This film causes manufacturing problems when the object is being handled in other areas of the plant. Conventional wash systems add solvents and heat to help break down the oil or grease. These solvents and the increased mist and humidity due to the heat can damage the components and joints of the robotic arm. Yet; waterproofing the robotic arm is expensive and difficult to maintain. Heated working fluids also increase the rate at which biological contaminants grow in the fluid system and inside the wash cell. These biological contaminants pose a health hazard to the people working in the plant, and can damage the robotic arm and other components in the wash system.

Solvents also make it difficult to recycle the working fluid. Solvents tend to mix or otherwise combine with the water and oil or grease to create emulsions. These emulsions are difficult to filter out or separate from the water without using expensive and bulky filtration system. The oil emulsions adhere to the pipe walls and clog the nozzles and other components in the system. The emulsion build up on the pipes and components creates a resilient layer that has a dampening effect on the pressurized system. The dampening effect causes delays to pressure changes in the working fluid, such as when the system is turned on or off. The oil emulsions also attacks the pump seals and other components in the system. Economical and efficient high-pressure water pumps have seals that require the working fluid to have 5 parts per million (ppm) of oil or less to avoid frequent maintenance shut downs. The entire wash system may need to be shut down and flushed every few hundred hours to clean, refurbish or replace the piping, components and pump seals. This maintenance is expensive and can render the system unacceptable for many industrial applications where such delays adversely affect the overall efficiency of the entire manufacturing process.

Another problem with conventional wash systems is that they require large quantities of water and take up large amounts of floor space. The filters and separator in the recycling system require a significant amount of time to separate the contaminants and emulsions from the water in order to achieve the desired purity levels of the system. As a result, a large quantity of inactive water must remain in these. filters and separators in order to support a relatively small volumetric flow through the spray nozzles. These filters and separators are also relatively large so that even a small wash cell requires a significant amount of plant floor space.

An additional problem with conventional robotic wash systems is that they lack the range of motion needed to use pure water to completely remove contaminants like oil from an object, particularly objects having more complex shapes. Conventional five-axis robotic arms and devices are not suitable for a pure water wash cell system. These robotic arms have difficulty positioning and articulating the spray nozzles to spray directly at or normal to the surface of the object being cleaned. The water sprays strike many surfaces of the object at angles that cannot completely remove an oil film layer. It has been found that angles of greater than about 7° degrees from normal start to deteriorate the cleaning effectiveness of a pure water spray for the purpose of removing oil and grease from the surfaces of an object.

While a conventional five-axis robotic arm might be able to wash a flat tray placed in direct alignment with the robotic arm, these arms do not provide a sufficient range of motion to enable them to handle most objects. These robotic arms lack the flexibility to get into the nooks and crannies found in the vast array of items that need to be cleaned in many manufacturing settings. Items with surfaces that face in different directions or are offset from the main axis of the robotic arm, or items having a number of projections or recesses in those surfaces are particularly troublesome. Five-axis arms also have difficulty or are incapable of cleaning surfaces with small areas that must be avoided to prevent damage to sensitive components.

A further problem with conventional robotic wash systems is that they have a limited spray width. In order to clean an item with a large surface area, the robotic arm must move back and forth across a surface many times. This increases the time the robot needs to get the item through the wash cell and reduces the overall capacity of the system. While some wash systems attempt to increase the spray width by aligning a number nozzle on a bulky frame to repeatedly clean a specific object with a specific shape, these systems are not designed to handle a wide variety of item shapes and sizes found in a manufacturing setting. In addition, the bulky frame may require hundreds of nozzles to clean a large item such as an airplane.

A still further problem with an array of aligned spray nozzles is that the nozzles have to be a certain distance from the surface of the item to perform properly. Adjacent nozzles with diverging sprays tend to intersect each other so that the overall spray pattern completely covers an area in a single pass. These diverging sprays pose problems for robotic applications that manipulate the spray nozzles through several passes over an object, particularly objects with more complex shapes. The width of the diverging spray varies when the nozzle is closer to or further away from the surface being washed. When the nozzles are too close to a surface, there are gaps between adjacent sprays so that the surface is not completely cleaned. When the nozzles are too far from the surface, adjacent sprays intersect, which tends to reduce the cleaning effectiveness of the sprays. This is particularly true for a high-pressure spray system where intersecting portions of spays have significantly reduced pressure and effective cleaning power.

A still further problem with conventional wash systems is that their usefulness is limited to cleaning the item. The systems cannot be adapted to provide an additional function such as deburring the surfaces or edges of the item. Capital expenditures for another robotic cell and fluid system are needed to provide the deburring operation.

A still further problem with conventional wash systems is that the end effector is not able to remove various types of debris from the item so that the wash nozzles can clean the entire item. In a manufacturing setting, debris and garbage such as dirty rags, towels, cans, paper bags can be left on an item moving along a conveyor system leading to the wash cell. The high-pressure water jets do not produce enough volumetric flow to blow this debris off the item during the wash cycle. As a result, portions of the item may be missed. The item may need to be taken off the conveyor system downstream of the wash cell and returned for additional cleaning.

The present invention is intended to solve these and other problems.

BRIEF DESCRIPTION OF THE INVENTION

The present invention pertains to a robotic wash cell including a six-axis robotic arm and end effector equipped with nozzles that spray unheated, solvent free, pure water at high-pressure to clean or debur objects by maintaining the nozzles in close proximity and substantially normal to each surface being cleaned or edge being deburred. The robotic cell wash is particularly useful for cleaning contaminants such as oil and grease from items having more complex shapes. The six-axis robotic arm positions the nozzles and their sprays substantially normal to each surface being cleaned or deburred. The nozzles produce a multi-zone spray pattern with a continuous effective cleaning zone. A water recycling and pressurizing system collects the used water, separates out the oil and grease contaminants to a level of about 5 ppm, and pressurizes the pure water to about 3,000 psi for washing operations or about 6,000 psi for deburring operations.

The present robotic wash cell and water system invention cleans contaminants such as oil and grease from an object having a solid surface without using solvents, detergents or other cleaning agents. The high-pressure, pure water spray efficiently and thoroughly cleans oil or grease from the surfaces of the item being washed. No significant trace or film of oil or grease remains on the surfaces of the item after it is washed. This is a significant advantage for many manufacturing processes where the presence of an oil or grease film can result in manufacturing problems that would otherwise require the item to be manually cleaned.

The present robotic wash cell and water system invention uses unheated, solvent free pure water as its working fluid. The pure water spray produced by the system does not create significant amounts of water and oil emulsions, such as those associated with wash systems using detergents or other solvents. The ambient temperature of the water spray further reduces the amount of emulsions and significantly reduces the amount of mist and humidity inside the cell. The water spray does evaporate or float in the air as readily as in heated systems. The wash cell has an air filtration system that is able to easily handle the mist and humidity that do occur. As a result, the robotic arm operates in a more friendly environment that is less contaminated with corrosive chemicals, and costly maintenance and waterproofing of the robotic arm are avoided or minimized. The ambient temperature spray also significantly reduces the growth of biological contaminants in the wash cell and water system that would otherwise pose a health risk to the people in the plant or damage the robotic arm and other components in the system.

The present robotic wash cell invention can thoroughly cleans objects by articulating its six-axis robotic arm to aim its high-pressure, pure water spray substantially normal to each surface being cleaned and maintain the nozzle in close proximity to these surfaces as the robotic arm and water spray move across them. The water is preferably pressurized to about 3,000 psi and maintained within a continuous efficient cleaning zone about eight to ten inches from the surface of the object during each cleaning pass. The sixth axis of the robotic arm allows it to articulate the water spray as it moves along a cleaning path along a particular surface so that the spray remains normal or substantially normal to that surface, as well as at the edge or intersection of two adjacent surfaces. This articulating, high-pressurized water spray maintains its cleaning effectiveness throughout the cleaning of the object. The robotic wash system is able to substantially completely clean oil or grease films from many surface materials, including metal, plastic, ceramic or painted surfaces in a cost effective and time efficient manner. The wash system has been found to be particularly effective at cleaning oil and grease films from the aluminum surfaces of many automotive components.

The present pure water wash system conserves water. Chemical emulsions that commonly occur in heated, solvent or detergent based wash systems are avoided so that the water supply can be economically recycled. The filtration system includes a small tank, and relatively inexpensive filters, plate separator for removing the oil contaminants and ultraviolet germicidal treatment unit to inhibit the growth of germs and bacteria. Expensive and bulky filtration, separation and treatment systems are not necessary.

The present robotic wash cell and recycled pure water system achieves a high level of water purity and requires minimal maintenance. The system can remain operating for 6,000 hours between scheduled maintenance intervals. This significantly long operating duration increases the capacity and overall efficiency of the system and the entire plant, particularly plants having assembly lines and just-in-time manufacturing. The present robotic wash system also achieves water pressures of 1,000 to 6,000 psi by using conventional high-pressure pumps with low maintenance ring seals. By eliminating solvents and the emulsions they produce, the system is able to achieve a water purity level having suspended solids of 30 microns or less, oil concentrations of 5 ppm or less, and a water temperature of 120° F. or less. This water purity and low temperature allows the system to use a conventional ring seal pump capable of achieving 6,000 psi. This pump also avoids heating the water. Expensive pumps with packed seals and short maintenance intervals are not necessary. In addition, oil emulsions that would otherwise adhere to the pipe walls or otherwise clog the nozzles and other components in the system are minimized to help achieve the long operating duration of the system. As a result, the present invention is ideally suited for many industrial applications.

Another advantage of the present wash system invention is that it requires a relatively small quantity of water and fits into a relatively small area of floor space. The oil separator fits inside a relatively small 100 to 250 gallon tank. A large portion of the water supply remains actively flowing through the pipes, pumps and spray nozzles. The size of the filters and separator are also small enough to justify a relatively small wash cell to accommodate a plant with a limited amount of available floor space.

A further advantage of the present robotic wash cell invention is its ability to wash a wide variety of objects, including those with more complex shapes. The robotic wash cell includes a six-axis robotic arm that accommodates a wide variety of objects. Although the robotic arm is secured to the floor, ceiling or other supporting surface in the wash cell, the robotic arm is flexible enough to allow a range of motion and articulation of the nozzles and water spray to reach the various surfaces of a wide variety of objects. The robotic arm directs the end effector, nozzles and spray normal to each of the various surfaces while maintaining the nozzles in close proximity to each surface being cleaned. The robotic arm is able to follow the contour of the object including its projections and recesses. The robotic arm can also move in closer to clean some areas more vigorously than others, or avoid designated areas that should not be cleaned to avoid damaging a sensor or other sensitive part. Accordingly, the robotic wash cell is suitable for a wide variety of commercial applications and manufacturing settings.

A still further advantage of the present robotic wash system is its relatively wide spray width. While keeping the weight of the end effector to a minimum, the present invention uses a limited number of two or more nozzles aligned to produce a spray pattern with a continuous working region of sufficient width to quickly clean an item with a large surface area. The robotic arm is programmed to move over the contours of the object in a multi-direction, multi-pass manner. By aligning two or more nozzles, the robotic wash cell is able to effectively clean larger or more complexly shaped objects in relatively few wash paths. This increases the through speed or capacity of the robotic wash cell so that it can clean a large number of objects in a relatively short period of time.

A still further advantage of the robotic wash cell is that its individual high-pressure sprays are offset so that they do not intersect. Each nozzle produces a diverging spray so that adjacent sprays begin to overlap at a set distance of about eight inches from the nozzle. Yet, each nozzle is offset or rotated a slight amount about its central axis so that adjacent sprays are parallel but do not intersect. As a result, the entire spray pattern strikes the surface being cleaned with a substantially uniform pressure or cleaning power. The amount of pressure or cleaning power depends on the distance the nozzle is from the surface being cleaned, not whether the surface is in an area of intersecting sprays with reduced cleaning power. When the nozzles are positioned about eight to ten inches from the surface being cleaned, adjacent sprays do not leave a gap between them. Instead, they create a continuous, substantially uniform zone with an effective cleaning power that the robotic arm is free to manipulate to efficiently clean items with complex shapes.

A still further advantage of the present wash system is its ability to debur the surface of the item. The wash nozzles on the end effector can readily be replaced with debur nozzles. The high-pressure pump is then easily switched to pressurize the water to about 6,000 psi or more by reducing the volumetric rate of water supplied to the pump and nozzles. Capital expenditures for an additional deburring station are avoided.

A still further advantage of the present wash system is its ability to clear or remove various types of debris from the item so that it can clean or debur the entire item. The end effector includes nozzles for blowing a large volume of air that combines with the high-pressure water spray to blow or sweep away any debris on the item. Debris and garbage such as dirty rags, towels, cans, paper bags that are inadvertently left on an item in a manufacturing setting are swept away by the combined sprays. As a result, the system is capable of reliably cleaning the entire item without missing areas that may be covered by debris and garbage.

Other aspects and advantages of the invention will become apparent upon making reference to the specification, claims and drawings.

BRIEF DESCRIPTION OF THE DRAWINGS

FIG. 5 is a top view of the end effector with two water nozzles and four air nozzles, and showing the water nozzles slightly offset so that their diverging spray patterns do not intersect.

FIG. 6 is a rear sectional view of the end effector of FIG. 5 showing the water spray patterns beginning to overlap at a distance of eight inches from the tip of the nozzles.

FIG. 12 is a side sectional view showing the robotic arm and end effector aligned to direct its spray substantially normal to the vertical side wall of a recess in the transmission pan.

DESCRIPTION OF THE PREFERRED EMBODIMENTS

While this invention is susceptible of embodiments in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
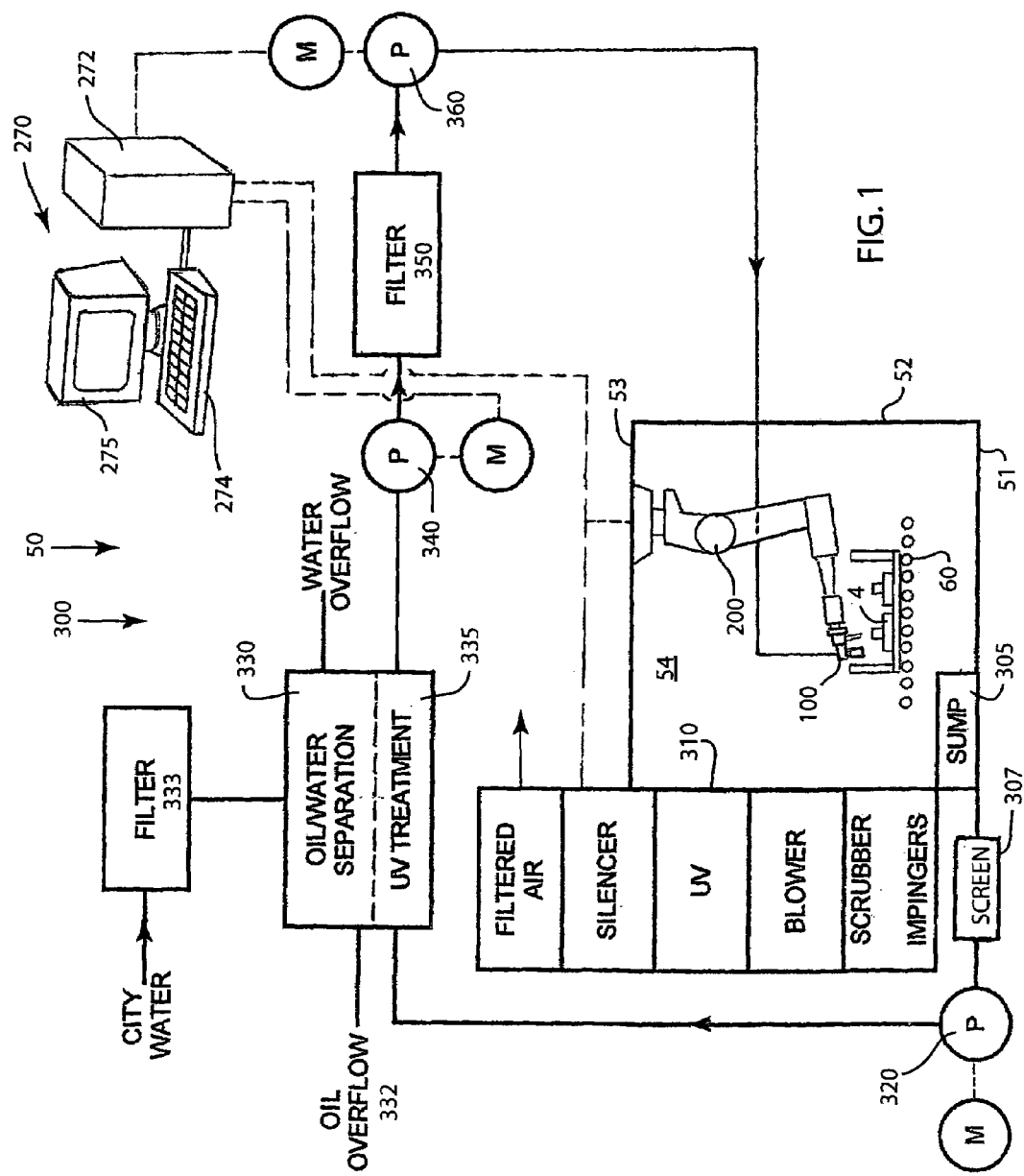
FIG. 1 is a schematic view of the present robotic wash cell and recycling and pressurization system showing the flow path of the working fluid through its pumps, screens and filters, and oil separator and ultraviolet treatment unit.
Figure 2:
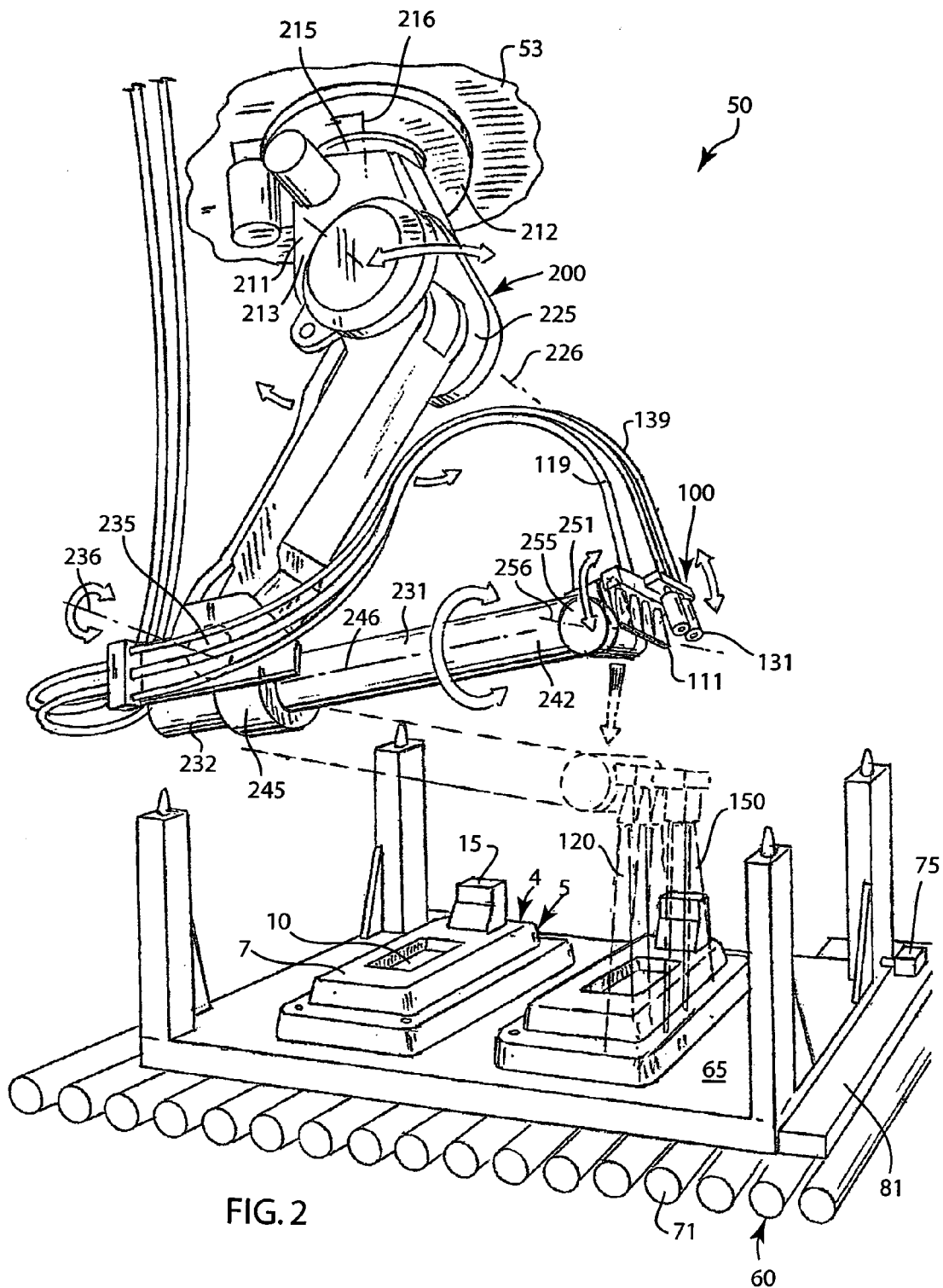
FIG. 2 is a perspective view of the present robotic wash cell invention showing a robotic arm with six axes of rotation mounted on a track on the ceiling of the wash cell, with the arm shown in phantom sweeping one of two transmission pans placed on a frame that is supported by a conveyor.

The present invention relates to a robotic wash cell using a recycling pure water system that is generally indicated by reference number 50 and shown in FIGS. 1 and 2. The robotic wash cell 50 is particularly suited to clean objects 4 that are at least partially covered or coated with a contaminant such as oil or grease. Oil and grease are particularly difficult to clean or remove from an object 4 because they form a thin film that clings to the surfaces of the object. The present invention is able to clean these contaminants and their films from objects 4, even when the object has a more complex shape.

Objects 4 with complex shapes have several surfaces that face in different directions, and include objects 4 with areas that need to be cleaned more thoroughly or sensitive areas that should not be cleaned at all. An example of a complex shaped object 4 is a transmission pan 5 shown in FIGS. 2 and 3. The pan 5 includes a number of surfaces 7a–e facing different directions, an outer rim 8, a recess 10 with sidewall surfaces 11 that are normal or otherwise angularly oriented to the upper surface 7a, and a projection 15 with sidewall surfaces 16 that are normal or angularly oriented to each other and the upper surface 7a. The outer end of the projection 15 has an area 17 that needs to be cleaned particularly thoroughly. The pan 5 has a sensitive area 18 containing a sensor 19 that should not be exposed to a high-pressure water spray. An example of another complex shaped object 4 is a transmission housing 25 shown in FIG. 4. The housing 25 has a cone-shaped body 26 with lower and upper ends 28 and 29 with a matrix of outwardly extending axial 32 and longitudinal 34 rims. The wider lower end 28 is placed on the floor so that the axial rims 32 are extended horizontally around the body 26 and the longitudinal rims 34 extend substantially vertically toward the upper end 29. The upper end 29 is somewhat square and has a number of projections 40.

Figure 3:
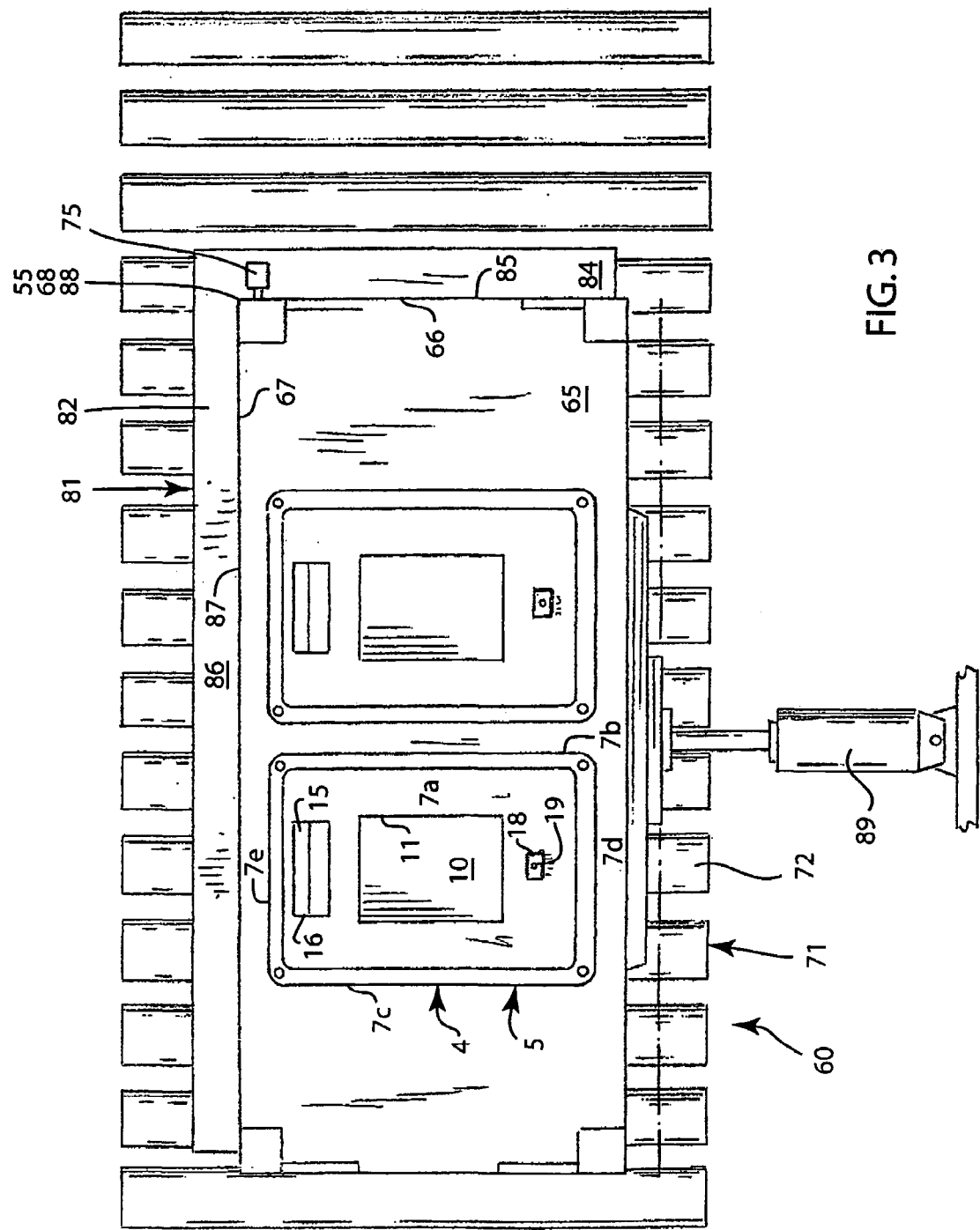
FIG. 3 is a top plan view showing the conveyor system aligning the frame and transmission pans relative to a set of predetermined coordinates at the corner of an alignment mechanism.

The robotic wash cell 50 generally includes a floor 51, walls 52 and a ceiling 53 that define an enclosed chamber 54 as shown in FIG. 1. The cell 50 has access openings (not shown) through which objects 4 and workers can enter and leave the chamber 54. A transport apparatus 60 moves and orients the object 5 relative to specific recognized coordinates 55 in the chamber 54 as shown in FIGS. 2 and 3. The transport apparatus 60 moves the items into the chamber 54 one at a time or in groups of two or more. When two transmission pans 5 are moved as shown, they are placed on a rack or frame 65 having a front end 66 and lateral sides 67. Each pan 5 is fixed to or otherwise securely placed on the frame 65 at a specific location and orientation relative to the frame. The pans 5 are oriented so that their front and side edges are parallel to the front 66 and sides 67 of the frame 65, respectively, and are each a predetermined distance from a corner 68 of the frame.

The transport and alignment apparatus 60 can take a variety of forms such as a conveyor 71 and alignment mechanism 81. The conveyor 71 has side rails that support spaced rollers 72 upon which the item 5 is propelled via gravity or drive rollers. The conveyor 71 is substantially horizontal a location where a stop 75 is located and where the item 5 will be cleaned. The alignment mechanism 81 includes an L-shaped bracket 82 having a forward segment 84 with a forward edge 85 and lateral segments 86 with a lateral edge 87. The forward and lateral edges 85 and 87 meet to form a corner 88. The forward edge 85 of the bracket 82 flushly engages the forward edge 66 of the frame, and stops the forward movement of the frame 65 and items 5 at a desired position. A positioning mechanism 89 then pushes the item against the lateral edge 85, and aligns the item 5 in a desired orientation relative to a set of predetermined coordinates 55, such as the corner of the alignment bracket. The height of the conveyor 30 positions the item 5 a desired distance from the floor 51 of the wash cell. The alignment mechanism 81 includes an L-shaped alignment member 82 with forward and lateral segments 84 and 85 adapted to engage the front and side of the frame 65 upon which a number of items 5 are placed. The forward movement of the frame 65 causes it to engage and align flushly against the front 84 of the alignment member 81. A lateral press 89 engages the frame 65 and moves it flush against the lateral segment 86. In this way, the conveyor 71 and alignment mechanism 81 align the frame 65 and the items 5 it carries to a set location relative to predetermined coordinates 55 or 88 inside the wash cell 20.

Although the transport and alignment apparatus 60 is shown and described as a conveyor 71 with an alignment mechanism 81, it should be understood that this apparatus can take many forms without departing from the broad aspects of the invention. For example, the transport apparatus can be a gantry that moves the item into and out of the wash cell 50 and aligns and places the item 5 at a desired location relative to specific coordinates 55. It can also be a track and cart rig that stops the item at a desired location relative to specific coordinates 55, or a robotic arm programmed to align and locate the item at a desired location relative to specific coordinates. A manual system of moving and aligning the item can also be used. These various transport apparatus should preferably locate and align the item to within about ⅛ to ¼ inch of the desired location relative to the predetermined coordinates 55.

The robotic wash cell 50 includes an end effector 100 as in FIGS. 5 and 6. The end effector 100 is preferably symmetrical and has a solid base 102 with a predetermined length that defines a centerline or centerline of mass 103. The base 102 rigidly supports two parallel, spaced apart mounting brackets 104 and 105 that are generally normal to the centerline 103. The end effector is aimed in a direction 106 generally normal to its centerline 103. The first or inner mounting bracket 104 rigidly supports a set of conventional air nozzles 110. The second or outer mounting bracket 105 rigidly supports a set of conventional high-pressure water nozzles 130. The mounting brackets 104 and 105 are generally spaced apart to accommodate the two sets of nozzles 110 and 130.

The set of air nozzles 110 preferably includes four nozzles 111 that are evenly spaced across the mounting bracket 104 at about two inch increments on center. Two nozzles 111 are symmetrically located on each side of the centerline 103 of the end effector 100. Each air nozzle 111 has a generally flat body 112. Each nozzle 111 has an inlet 114 for receiving pressurized air, and a head 115 with an outlet 116 that spans its width of about 1½ inches. Air is supplied to the nozzle inlet 114 at a pressure of about 60 psi via a conventional air hose 119. Air exits each outlet 116 at a rate of about 60 cubic feet per minute (cfm) and a speed of about 85 miles per hour (mph). The nozzles 111 are parallel to each other and parallel to the direction of aim 106 of the end effector 100. The nozzles 111 combine to produce a spray pattern 120. The air nozzles 111 are preferably Model No. AA727 nozzles made by Spraying Systems Company of Wheaton, Ill.

The set of water nozzles 130 preferably includes two conventional high-pressure water nozzles 131. Each water nozzle 131 has a generally tubular body 132 that defines a centerline 133. The nozzles 131 are rigidly attached to the mounting bracket 105 and spaced about two inches apart on center. The centerline 133 of each nozzle 131 is normal to and symmetrically located about one inch from the centerline 103 of the end effector 100. The water nozzles 131 are spaced about 2¾ inches from the air nozzles 111. The nozzle 131 has an inlet 134 that receives high-pressure water, and a head 135 with a narrow outlet 136 that forms an orifice or point of impingement for spraying the high-pressure water. The orifice 136 is located on the centerline 133 of the nozzle. Pressurized water is supplied to the nozzle inlet 134 via a conventional high-pressure hose 139 in the range of about 1,000 to 5,000 psi. When cleaning oil from an aluminum surface, the inlet pressure is preferably about 3,000 psi, and the water exit rate per outlet is about 3.5 gallons per minute (gpm) per nozzle with a subsonic spray speed of about 400 mph. The nozzles 131 have an impingement efficiency of about 65 percent. The centerlines 133 of the nozzles 131 are parallel to each other, and parallel to the direction of aim 106 of the end effector 100. The water nozzles 131 are preferably a PowerJet Model No. 38955-04 nozzles made by Spraying Systems Company.

Pressurized water is sprayed from each nozzle 131 in the form of a dispersing spray 141 as shown in FIGS. 5 and 6. The orifice or point of impingement 136 of each nozzle 131 preferably has a generally rectangular shape to produce a generally thin, fan shaped spray 141 emanating from the orifice. Each spray 141 has a centerline 143 that is a linear extension of the centerline 133 of its nozzle 131. Each spray 141 is symmetrical about its centerline 143 and has generally linear side edges as shown in FIG. 5, and a generally planar layer in the direction of aim 106 as shown in FIG. 6. Each side of the spray 141 angles from the centerline 133 at an angle of about 7½°. The impingement power or cleaning effectiveness of the spray 141 remains substantially constant between a range of about two inches to about eight inches from the orifice 136. At a distance of about ten inches, the spray 141 retains about 80 percent of this impingement power. After a distance of about ten inches, the integrity and shape of the spray 141 begins to disintegrate, and its impingement power and cleaning effectiveness start dropping off exponentially.

Each spray 141 has an effective washing range for cleaning films such as oil of about one inch to about ten inches when the water is supplied at 3,000 psi. A stand off distance of about one to two inches from the nozzle head 135 produces vigorous washing that actually heats the surface and its oil film. This is an area 145 of ultra high-pressure or cleaning power. A stand off of about four to six inches produces hard washing that can penetrate or blast through a pool of water in a recess. This is an area 146 of very high-pressure or cleaning power. A stand off of about eight to ten inches produces effective washing that substantially completely removes an oil film from a metal surface at a reasonable rate of speed for the intended purpose of this particular robotic wash system, such as an end effector 100 speed of about two inches to about one foot per second. This is an area of effective washing power 147. Each spray 141 retains an effective washing pressure or cleaning power above a working limit of about 2,000 psi through this washing range 147 when a contaminant such as oil is being cleaned from a material such as metal. This working limit can be dropped to about 600 psi for cleaning oil form materials such as plastic. In this embodiment, a stand off of about eight to ten inches is effective for cleaning an oil film from an aluminum surface using a robotic arm speed of about two inches to about one foot per second. Each spray 141 retains a thickness of about ¹⁄₁₆ to ⅛ inch at a distance or stand off of eight inches from the orifice 136. Additives are not added to the water to maintain the integrity and effectiveness of the spray 141 for longer distances, because presently known additives are hazardous and difficult to use in a recycling water system. The flow of water to one of the nozzles 131 can be turned off when the end effector 100 comes in close to a surface as in region 151 so that the spray only impacts a specific area.

The individual sprays 141 combine to produce a multi-zone spray pattern 150 shown in FIG. 5. The spray pattern 150 is divided into three distinct zones or regions 151, 152, and 153 as it progresses outwardly from the nozzles 131. The first region 151 includes discrete sprays 141 and a gap 156 between these adjacent sprays. This region 151 extends from the nozzle head 135 of the adjacent nozzles 131 to a distance of just less than about eight inches from the orifices 136 taken along centerline 133 to the location 157 where the sprays begin to overlap. The discrete sprays 141 widen and the gap 156 narrows as the sprays move away from the nozzle heads 135. The concentration of the sprays 141 and their pressure or cleaning power is greatest in this first region 151. As discussed above, when the nozzle head 135 is within about one to two inches of the surface being cleaned, the sprays 141 impact the surface with such force that they actually heat the surface and the oil or grease contaminant as it is being removed. In this ultra high-pressure region 145, the sprays 141 must be rapidly moved along the surface to avoid unnecessary erosion of the surface being cleaned.

The second region 152 of the spray pattern 150 begins at the location or boundary 157 where the adjacent sprays 141 begin to overlap. Each spray 141 has a width of about two inches and the spray pattern 150 has a continuous width of about four inches. The area of overlap 158 widens as the spray pattern 150 extends beyond eight inches. The spray pattern 150 formed by the individual sprays 141 of the set of nozzles 130 combine to form this continuous effective working region 152 with a depth that extends from about eight inches to about ten inches from the nozzle heads 135 and their outlets 136. Although there is no clearly defined boundary demarcating where the second region 152 ends, this region generally extends to a location or boundary 159 where the pressure or cleaning power of the sprays 141 and spray pattern 150 falls below a desired level practical for the particular robotic application being performed. In this embodiment, the desired level is about 2,000 psi and the outer boundary 159 of the individual sprays 141 and the effective working region 152 is about ten inches.

The third region 153 of the spray pattern 150 extends beyond the outer boundary 159 of the continuous effective wash area 152. The individual sprays 141 begin to deteriorate in this region 153. Adjacent sprays 141 begin to intersect in the overlapping areas 158 to form a more turbulent spray of pressurized water. The force or power of the disintegrating water spray 150 remains effective for general sweeping of dirt and debris from the surfaces of the item 5 but is not generally sufficient to substantially completely remove contaminants such as oil and grease films in a time efficient manner using a robotic system. Although there is no clear outer boundary demarcating where the third region 153 ends, this region generally extends to about one to five feet from the nozzles 141. The pressurized air spray from the air nozzles 111 will tend to mix with the water spray 150 in this outer region 153.

As best shown in FIG. 6, each nozzle 131 and its spray 141 is rotated a slight amount about its centerline 133 so that the individual sprays 141 do not intersect each other in the area of overlap 154, at least inside regions 151 and 152. When the nozzles are two inches apart, an angle of about 2° is typically sufficient to keep the sprays from intersecting in regions 151 and 152. Intersecting sprays 141 tend to drop the effective washing pressure below the desired working limit of about 2,000 psi, as discussed above. This drop in pressure is undesirable because it can prevent the formation of the continuous effective cleaning zone 152 with a sufficient depth useful for robotic applications.

Although the end effector 100 is shown and described with a set 130 of two water nozzles 131 that produce two individual sprays 141, it should be understood that the end effector could have one water nozzle to keep the weight of the end effector to a minimum or three or more water nozzles to produce a wider spray pattern 150 without departing from the broad aspects of the invention. The geometry of the multi-zone spray pattern 150 could also be modified without departing from the broad aspects of the invention. For example, the nozzles 131 can be moved closer together to draw in the inner location 157 defining the beginning of the effective working region 152, or by increasing the pressure of the water supplied to the nozzles 131 so that the outer boundary 158 moves further away from the nozzles.

Figure 7:
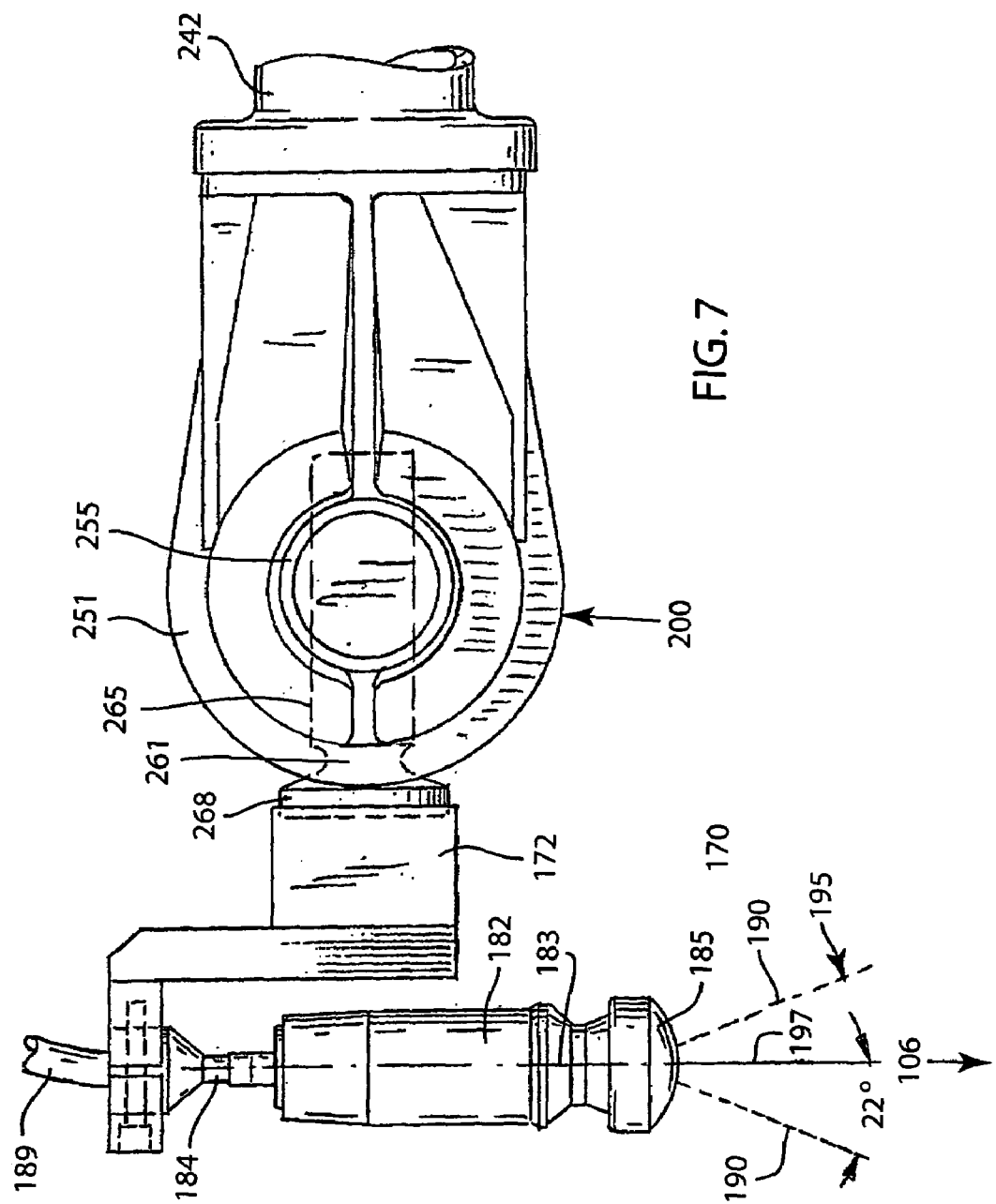
FIG. 7 is a front view of a debur end effector equipped with an auto-rotate debur nozzle with two offset water jets, each jet spraying 22° off the nozzle centerline.

The robotic wash cell 50 also uses a debur end effector 170 for deburring items 5 as shown in FIG. 7. The end effector 170 is preferably symmetrical and has a solid base 172 with a predetermined length that defines a centerline or centerline of mass 173. The base 172 rigidly supports a mounting bracket 174. The mounting bracket 174 rigidly supports a conventional debur water jet nozzle 181. The end effector 170 is aimed in a direction 176 generally normal to its centerline 173.

The debur nozzle 181 has a generally tubular body 182 that defines a centerline 183. The centerline 183 of the nozzle 181 is normal to and intersects the centerline 173 of the end effector 170. The nozzle 181 has an inlet 184 for receiving high-pressure water, and a head 185 with two outlets or orifices 186 that spray two relatively solid streams or jets 190 of high-pressure water. The pressurized water is supplied to the nozzle inlet 184 via a conventional high pressure hose 189 in the range of about 5,000 to 15,000 psi, and preferably at about 6,000 psi for deburring an aluminum object 4. Each jet 190 has a diameter of about 50 thousandth of an inch. The head 185 is rotatably attached to the body 182. Each orifice 186 is offset from the centerline 183 of the nozzle about one inch, and canted or angled about 22° from the centerline 183 of the nozzle 181. The orifices and water jets 190 are angled to point in opposed directions. The offset and angle of the water jets 190 cause the head 185 to automatically rotate about its centerline 183 at a high rate of speed so that the jets 190 form a conical spray pattern 195 with a centerline 197. The debur nozzle 181 is preferably Aquajet Model No. RD1000 nozzle of Hammelmann, Inc. located in Dayton, Ohio.

The deburring effectiveness of the jets 190 remains substantially constant to a distance of about two to six inches from the orifice 186. At a distance of about six inches, the jets 190 retain about 80 percent of their effectiveness. After a distance of about one foot, the integrity and shape of the jets 190 begins to disintegrate, and their deburring effectiveness starts dropping off exponentially. Each jet 190 has an effective deburring range of about ⅛ inch to about six inches for effective deburring of a metal item at a linear speed of about one half inch to about three inches per second. The jets 190 retain an effective deburring pressure above a desired working limit of 4,500 psi through its effective deburring range for deburring soft aluminum. This limit increases to about 12,000 psi for deburring hard steel. Each jet 190 retains a thickness of about 50 thousandths of an inch at a stand off or distance of about six inches to one foot from the orifice 186. Again, additives are not added to the water to maintain the integrity and effectiveness of the spray 190 for longer distances.

The robotic wash cell 50 includes a conventional six-axis robotic arm 200. The end effector 100 or 170 is rigidly mounted to the robotic arm 200, which moves and articulates the end effector to wash or debur the object 4. The robotic arm 200 can be anchored to the ceiling 53 as in FIG.

Figure 8:
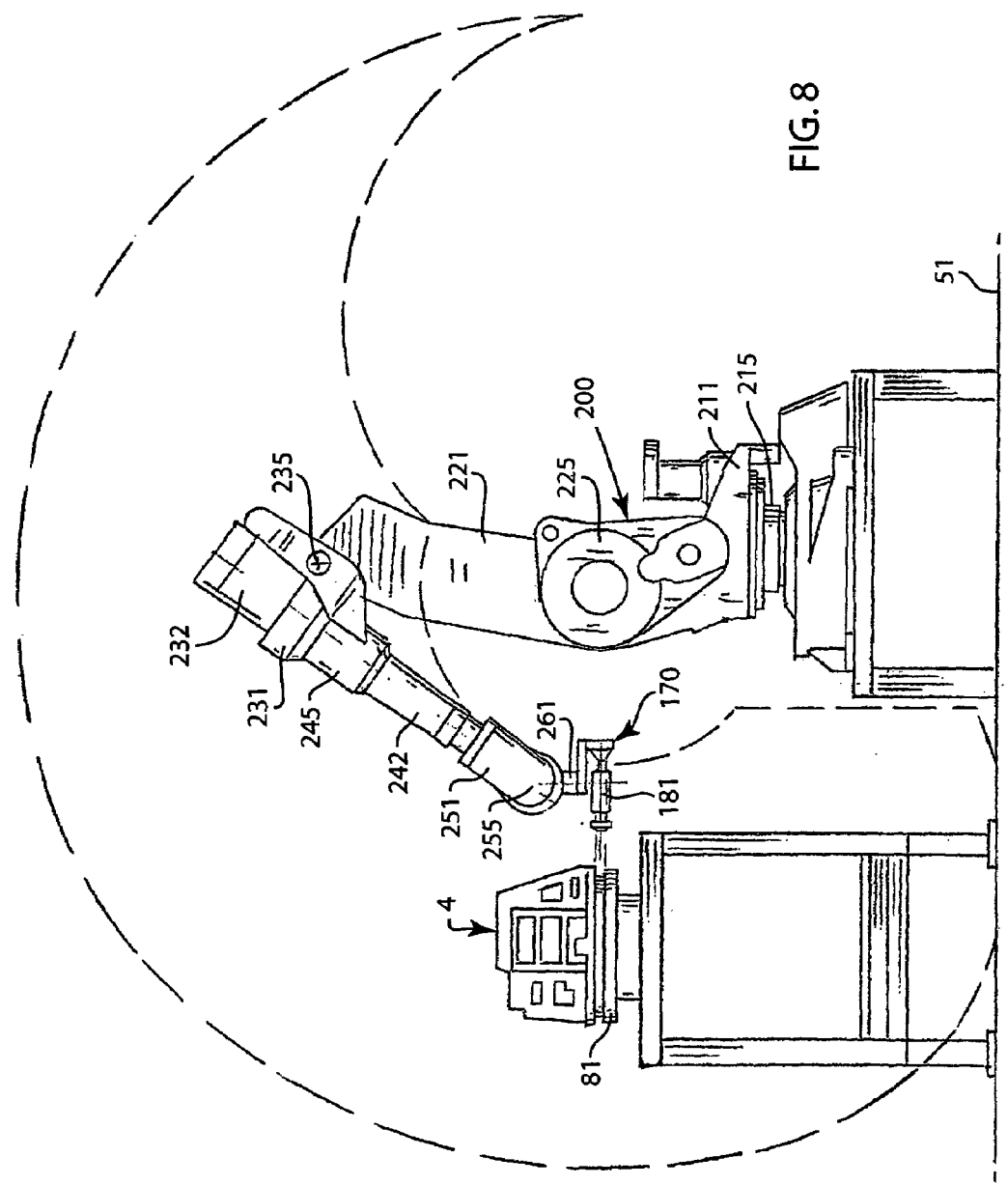
FIG. 8 is an elevation view of the robotic arm mounted on a pedestal anchored to the floor with the robotic arm on one side of a complex item resting on a table with the robotic arm positioning its end effector and debur nozzle in close proximity to the item with its sixth axis rotated to direct the debur nozzle normal to the surface of the item.
Figure 9:
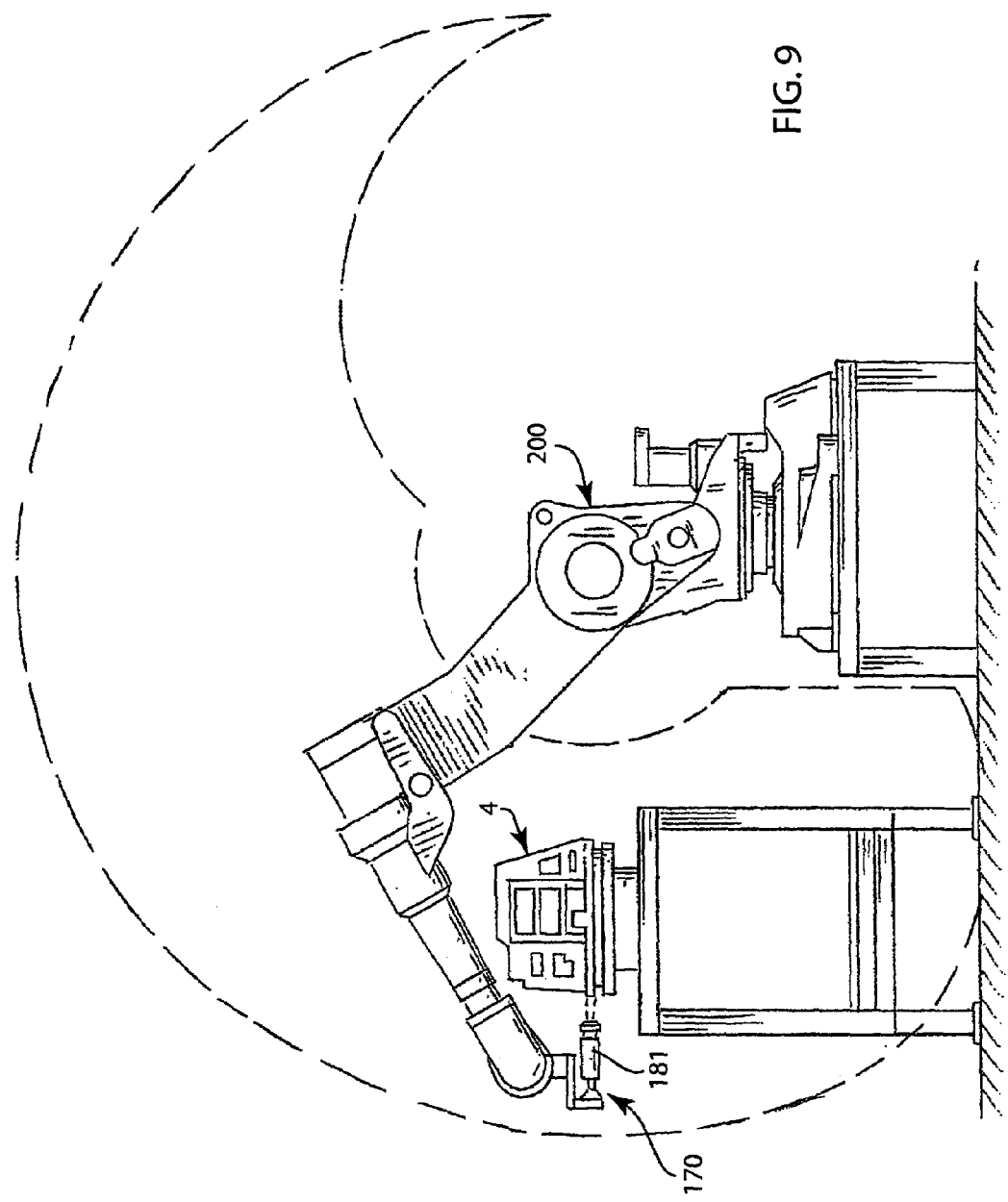
FIG. 9 is an elevation view of the robotic arm of FIG. 8 and reaching over the complex item and table with its sixth axis rotated to direct the debur nozzle back at the item.

2, the floor as in FIGS. 8 and 9, or any other supporting surface in the wash cell 50. The ceiling mount allows the robotic arm 200 to be located above the item 4 when it is brought into the wash cell 50, and can be raised above the working area of the wash cell 50 so that it is out of the way and does not interfere with or become damaged by the item 4 as it is moved into and out of the wash cell 50.

The robotic arm 200 has a base 211, inner arm segment 221, outer arm segment 231, wrist 251 and mount 261. These components are robustly designed to carry the weight of the arm 200 and its end effector 100 or 170 so that there is relatively minimal deflection in the arm 200 when it is fully extended or moved at a high rate of speed. The components are firmly connected to each other so that there is relatively minimal play as the arm 200 moves from one position to another or the direction of the spray 150 or 190 is altered. The robotic arm is preferably a Model IRB2400-16F robotic arm made by ABB, Inc. of Auburn Hills, Mich.

The base 211 has a mount 212 and a rotatable portion or turret 213. The mount 212 is rigidly secured to the floor 51, ceiling 53 or other supporting surface. The turret 213 is rotatably secured to the mount 212 via a rotatable joint 215 having a central axis 216 that constitutes the main axis of the robotic arm 200. The central axis 216 is generally aligned normal to the horizontal ceiling 53, but could be mounted at an angle to the floor 51, ceiling 53 or conveyor 71 if desired. The main axis 216 of the robotic arm 200 remains fixed inside the cell 50 relative to the floor 51 or ceiling 53 as in FIGS. 2, 8 and 9. During use, the turret 213 is free to rotate about this axis 216 so that the arm 200 can be directed to extend in any rotational direction relative to this axis of the arm.

The first or inner arm segment 221 has a predetermined length with inner and outer ends. The inner end is pivotally joined to the turret at a first pivot joint 225 that allows the upper arm 221 to pivotally rotate about a first pivot axis 226 relative to the base 211. The inner arm segment 221 and its pivot joint 225 allow the arm 200 to be raised or lowered vertically from the ceiling 53. The axis 226 of the inner arm segment 221 is generally perpendicular to the axis 216 of the base 211, and remains horizontal to the floor 51 or ceiling 53. During the use of a ceiling mounted robotic arm 200, the inner arm segment 221 is typically pivoted to a lower position to provide generally horizontal movement of the end effector 100 or 170 along the item being cleaned 5.

The second arm segment or forearm 231 has a predetermined length and an inner portion 232 with inner and outer ends. The inner end is pivotally joined to the outer end of the upper arm 221 at a second pivot joint 235 that allows the forearm 231 to pivotally rotate about a second pivot axis 236 relative to the inner arm segment 221. This axis 236 of the forearm 231 is generally parallel to the axis 225 of the upper arm segment 221 and perpendicular to the axis 216 of the base 211. During use, the forearm 231 and joint 235 allow the end effector 100 or 170 to generally move vertically toward the item 5 as in FIG. 2, or along one of its vertical sides. The forearm 231 also has an outer portion 242 with inner and outer ends. The inner end is rotatably joined to the outer end of the inner portion 232 at a second rotation joint 245 having a central axis 246. The second portion 242 is free to rotate about the central axis 246. The central axis 246 is normal to the pivot axis 236 of the forearm 231. During use, the second portion 242 and joint 245 allow the arm 200 to rotate end effector 100 into a direction of aim 106 toward the item 4 being cleaned when the arm is moving along the side the item.

Figure 13:
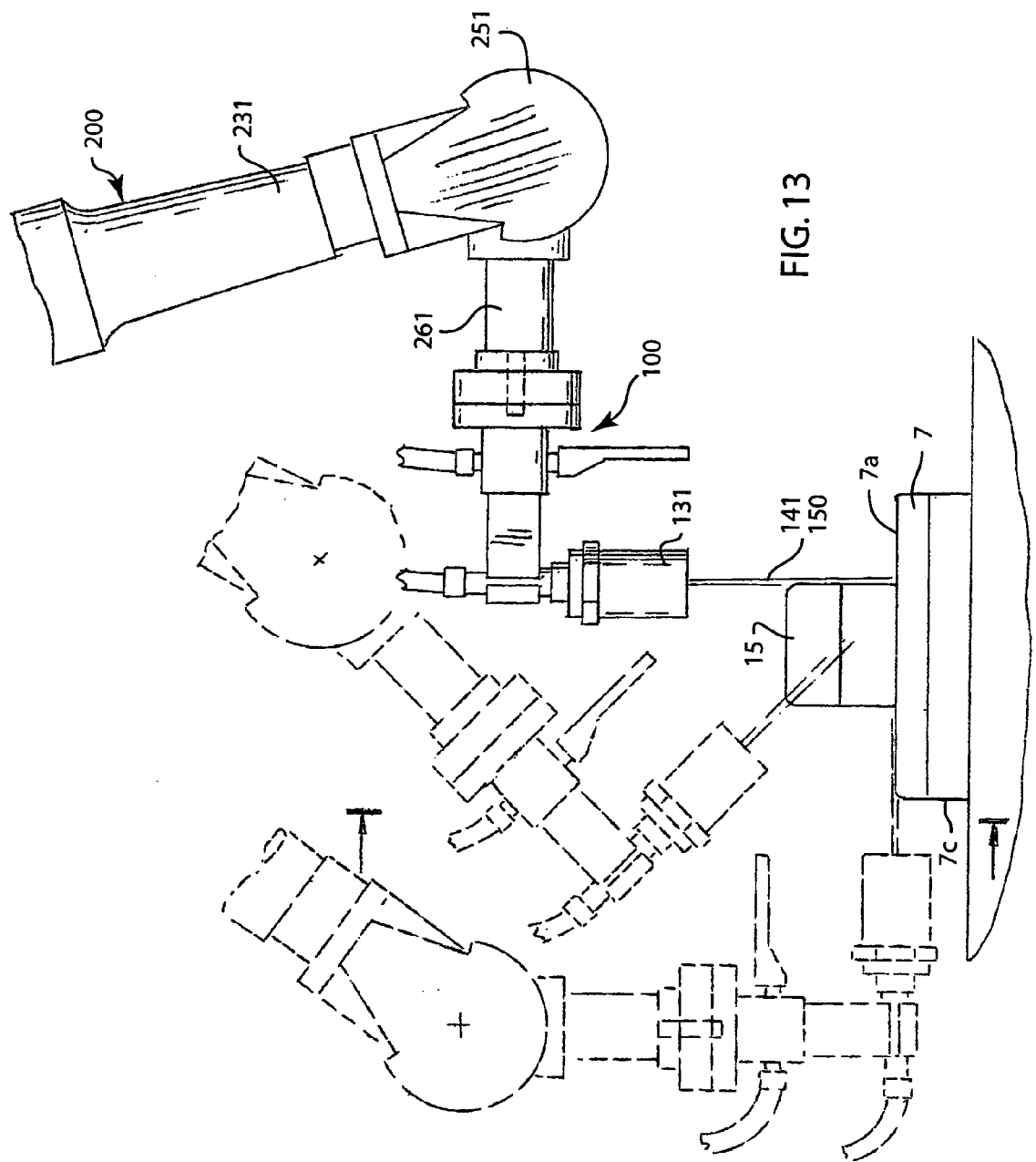
FIG. 13 is a side view showing the robotic arm moving along a linear path to clean the top surface of an item and articulating along its fifth axis to move along another linear path of travel to clean one of the side surfaces of the item.
Figure 14:
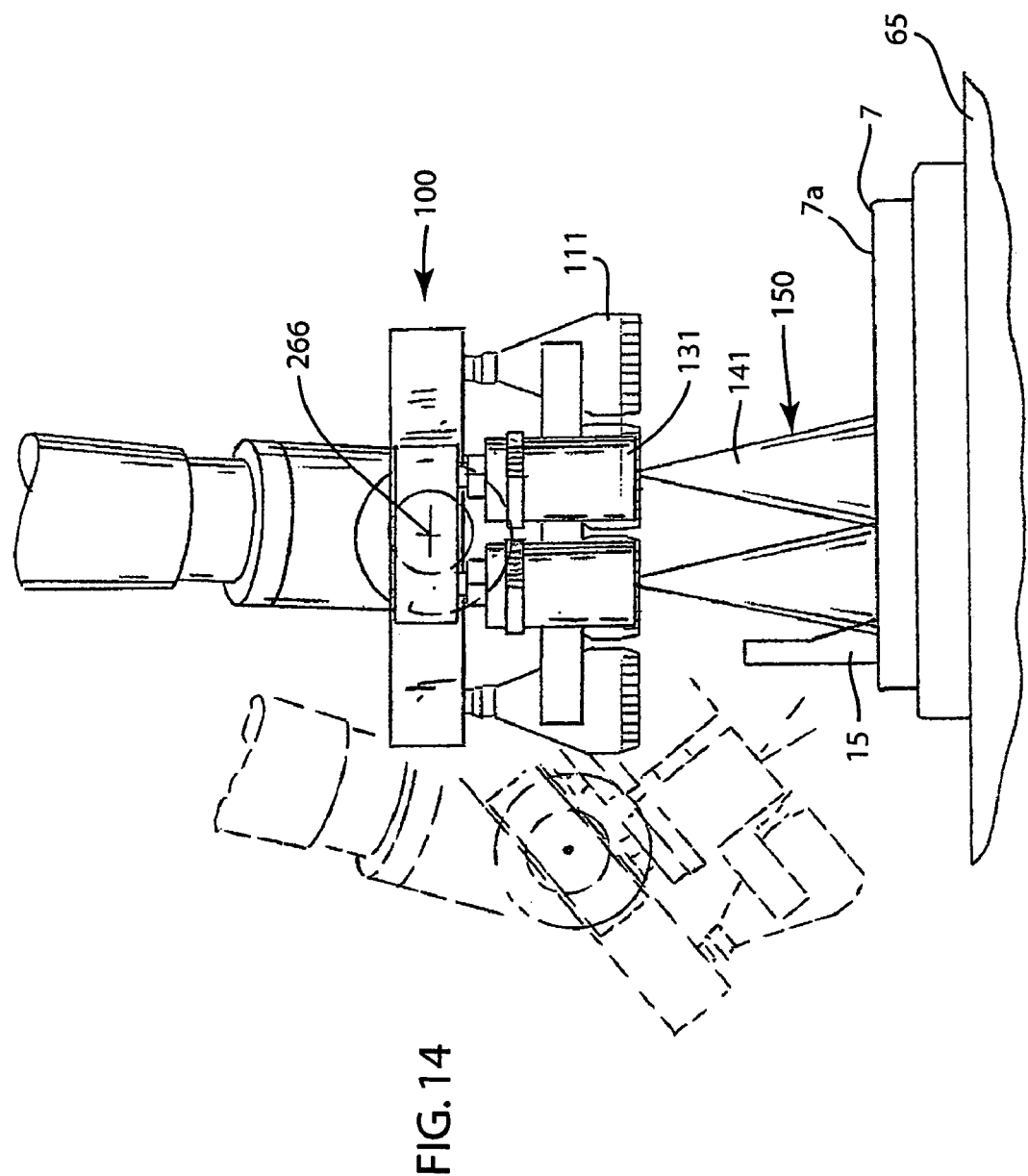
FIG. 14 is a side view of the robotic arm moving along a linear path of travel into the page to clean the top surface of the item, and showing the end effector in phantom articulating along its sixth axis to clean the front side of the item.

The wrist 251 is pivotally joined to the outer end of the outer portion 242 of the forearm 231 at a third pivot joint 255 to allow the wrist to rotate about pivot axis 256. The pivot axis 256 is generally parallel to pivot axis 226 and 236 and normal to the central axis 246 of the forearm 231. During use, the wrist 251 and joint 255 allow the arm 200 to rotate or articulate the end effector 100 or 170 and spray 150 or 190 from a direction substantially normal to the top surface of the item 4 to a direction substantially normal to the side surface of the item as shown in FIG. 13. However, this articulation of the end effector 100 will only maintain proper normal alignment of the nozzles 131 and spray 150 to the surface of the item 5 when the item is aligned directly under the main vertical axis 216 of the robotic arm 200. When the surface being cleaned is offset from this axis 216, joint 255 will not, by itself or in conjunction with the joints 215, 225, 235 and 245, be able to maintain its direction of aim 106 of nozzles 131 and spray 150 substantially normal to that surface while moving the end effector 100 along this surface, particularly while holding the head 135 of the nozzles 131 a fixed distance from that surface.

The mount 261 is rotatably joined to the wrist 251 at a third rotation joint 265 having a central axis 266 as shown in FIGS. 6–9, 13 and 14. The mount 261 is free to rotate about the central axis 266. The mount 261 has a proximal end 268 for securely mounting the end effector 100 or 170. The central axis 266 is generally linearly aligned with the central axis 246 of the forearm 231 when positioned as in FIGS. 2, 6 and 7, but is angularly offset from axis 246 when the wrist 251 is rotated about axis 256 as in FIGS. 8, 9, 13 and 14. During use, the mount 261 and joint 265 allow the arm 200 to transition from a first path of travel along one surface of the item 4 to a new path of travel along an adjacent surface. The new path of travel can be either parallel or perpendicular to the first path of travel. The mount 261, end effector 100 or 170, and nozzles 131 or 181, are rotated about axis 266 so that the spray 150 is angled or normal to the new path of travel as shown in FIG. 13. The combination of the six joints 215, 225, 235, 245, 255 and 265 allows the direction of aim 106 of nozzles 131 and 181, sprays 141, 150 and 195 to remain substantially normal to each surface of the item 4 being cleaned while moving the end effector 100 along various paths of travel over its various surfaces and while simultaneously holding the head 136 of the nozzles a fixed distance from each surface, even when those surfaces are offset from the main axis 216 of the robot 200. The direction of aim 106 and centerlines 143 or 197 of the sprays 141 or 195 preferably remain within 5° of normal to the surface being cleaned.

Each of the six joints 215, 225, 235, 245, 255 and 265 in the robotic arm 200 includes a separate servo motor (not shown) for selectively rotating or pivoting its associated member 211, 221, 231, 242, 251 and 261. Each servo motor, and thus the movements of the joints, members and robotic arm 200, is programmably controlled by a conventional control system 270, such as the Model No. S4C control system of ABB, Inc. The control system includes a controller 272, an input terminal 274 and a monitor 275. An operator programs the robotic arm 200 and end effector 100 to move along particular linear and arcuate paths of travel and to articulate the end effector 100 or 170 and nozzles 131 or 181 through a wide range of motions to clean the desired surfaces of the object 5.

Water Recycling and Pressurization System

A recycling and pressurization system 300 is shown in FIG. 1. The pump motors and other operating components in this system 300 are preferably programmably controlled by the computer control system 270 with allowable manual overrides to adjust or fine tune the system. After the water sprays 150 or 190 clean the surface of the item 5, the contaminated water falls via gravity to the floor 51 of the wash cell 50. The unfiltered water and oil fluid mixture flows via a conventional floor drain system (not shown) to collect in a sump 305. Water and oil emulsions are kept to a minimum because the sprays 150 do not use detergents or other solvents to help remove the oil and grease from the object being cleaned, and because the water spray 150 remains between ambient temperature and 120° F. The fluid in the sump 305 is at ambient temperature.

The water and oil mist suspended in the air inside the wash cell 50 is drawn through a demist unit 310 having a conventional scrubber impinger unit via a conventional blower with a 5 horsepower (HP) motor capable of moving 4,500 cubic feet per minute (cfm). The air drawn into the demist unit 310 in replaced by unfiltered, ambient air via a duct or air intake (not shown). The contaminated fluid collected by the scrubber impinger unit 310 is routed to the sump 305. The demisted air passes through an ultraviolet (UV) treatment unit to kill any bacteria or microorganisms and a silencer to minimize acoustic noise.

The unfiltered water and oil fluid mixture flows from the sump 305 at a rate of 3 to 10 gallons per minute (gpm) via one foot of gravity pressure through a screen (not shown) that removes solids from the fluid. The fluid then flows to a conventional pneumatic pump 320 capable of producing 10 psi at 11.5 gpm. The pump 320 pressurizes the fluid to about 5 psi and moves it at a rate of 3 to 10 gpm. The fluid is at ambient temperature as it flows to a 100 to 250 gallon stainless steel tank containing a conventional oileophelic plate-type separation unit 330 for separating unfiltered water and oil fluid mixture. The separator 330 produces water containing no more than 5 (ppm) of oil. The separator units is preferably a Plate-Pak separator made by Freytech, Inc. of Florida. Separated oil flows via a gravity drain 332 at a rate of 0 to 6.5 gpm where it is recoverable to a composition of 99.99% oil, 0.002% water and 0.008% solids. Makeup water is added to the system via the separator 330 at a rate of about 100 gallons per day (gpd). This makeup water is taken from standard city tap water having a temperature of ambient to 45° F. and filtered 333 via a conventional reverse osmosis filter 333 to a filtration level of 15 ppm of total dissolved solids. The separator 330 is provided with a gravity drain 337 capable of draining 0 to 3.5 gpm of overflow water from the separator. A conventional UV treatment unit 335 that kills any biological or microorganisms in the water is also placed in the stainless steel tank. The UV treatment unit 335 is preferably a Model No. TM13 treatment unit made by Atlantic Ultraviolet, Inc. of New York.

Pure, unfiltered, ambient temperature water flows from the separator 330 at a rate of about 7 gpm via three feet of water pressure to a conventional centrifugal pump 340 with a 1.0 HP motor. This booster pump 340 pressurizes the water to 55 psi and moves the fluid at a rate of about 7 gpm to a conventional 30 micron element filter 350 capable of filtering 20 gpm of water at a pressure of 100 psi. Ambient temperature water leaves the filter 350 at pressure of about 50 psi at a rate of about 7 gpm, and a purity level of 5 ppm of oil and total dissolved solids no larger than 20 to 30 microns.

The fluid then passes through a conventional piston plunger pump 360 driven by a conventional 15 HP motor that pressurizes the water to about 3,050 psi and moves the working fluid at a rate of about 7 gpm. The pump is preferably a Model No. HDP22 pump made by Hammelmann, Inc., which is capable of pressurizing the pure water to up to about 15,000 psi. The water leaving the pump 360 is between ambient temperature and 120° F. The pump has a sensor activated switch (not shown) that automatically shuts off the pump should the water temperature exceed 120° F. This pure, filtered water is delivered to the wash nozzles 131 at about ambient temperature and 3,000 psi. A water pressure of about 6,000 psi for the debur nozzles 181 is attained by reducing the rate of fluid flow through the piston pump 360 to about half or 3.5 gpm.

The system 300 has been disclosed to use a water supply of pure water. Pure water does not contain detergents, solvents, chemicals or additives to enhance the cleaning ability of the water, other than the typical agents found in a public water system or softened well system. Pure water is economical, easily accessible to manufacturing plants, and helps avoid or minimize the formation of oil emulsions. However, it should be understood that although the working fluid of the system 300 is preferably pure water, it should be understood that other working fluids that do not tend to form oil emulsions when sprayed at high-pressure to clean a contaminant such as oil or grease could also be used as the working fluid of this system.

Operation of Robotic Wash Cell

Although the following should be understood given the above discussion, the following is provided to assist the reader in understanding the operation of the robotic wash cell 50 in the preferred embodiment. The transport apparatus 60 such as a conveyor 71 moves an item 4 such as transmission pan 5 into the wash cell 50. The transporter 60 is preferably programmably controlled by the control system 270. The item 5 contains an oil film on its surfaces. The item 5 moves along the conveyor 71 until it reaches a desired work area at a known height in the room 50 and triggers a mechanism such as a sensor or switch to stop the forward motion of the item. The alignment mechanism 81 then positions the item 5 so that it will remain fixed at a particular desired position relative to a set of predetermined coordinates 55 known to or programmed into the controller 272. The item 5 is then ready to be cleaned.

The object 5 is first swept by the robotic arm 200 and end effector 100 to remove any loose dirt or debris. The robotic arm 200 is equipped with an end effector 100 for washing the item 5. The arm 200 is brought down from its home position near the ceiling 53 of the wash cell 50. The conventional air system (not shown) and water system 300 are activated to supply air at about 60 psi and water at about 3,000 psi to the inlets 114 and 134 of nozzles 111 and 131, respectively. The robotic arm 200 then programmably moves the end effector 100 to a start position about one to four feet above the main upper surface of the item 5 based on the predetermined coordinates 55 of the item, and articulates the end effector so that its direction of aim 106 is substantially normal to this surface. The robotic arm 200 then moves in a series of programmed paths of travel above the main upper surface of the item 5 while maintaining its direction of aim 106 substantially normal to this main upper surface to dislodge and blow away the loose dirt and debris. The paths of travel are linear or arcuate to correspond to the shape or contour of the main upper surface of the item and maintain the one to four foot clearance between the nozzle heads 115 and 135 and that surface. When necessary, the robotic arm will also move the end effector to a position along side the item about one to four feet from the main side surface of the item, and articulates the end effector 100 so that its direction of aim 106 is substantially normal to that main side surface. The arm will then move in one or more programmed paths of travel along the main side surface while maintaining the direction of aim 106 and distance of the nozzles 131 substantially normal to and one to four feet from this main side surface and to further dislodge and blow away the loose dirt and debris. If necessary, this sweeping operation can be repeated for each main surface of the item.

Figure 10A:
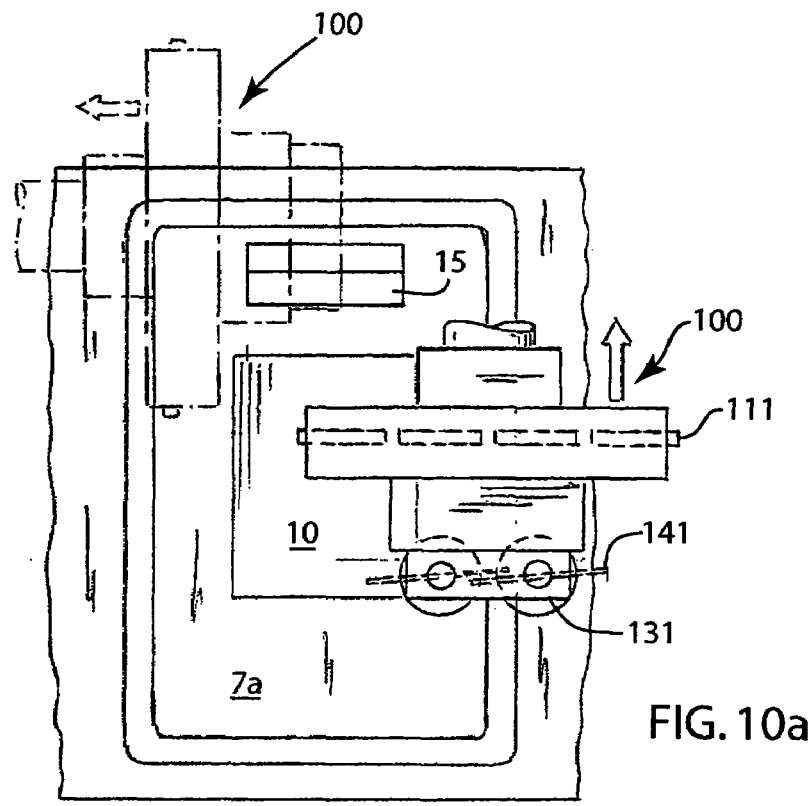
FIG. 10 is a top plan view showing the robotic arm moving the end effector and nozzles along a path of travel over multiple horizontal surfaces of the transmission pan while maintaining the nozzle spray normal to the surfaces being cleaned.
Figure 11A:
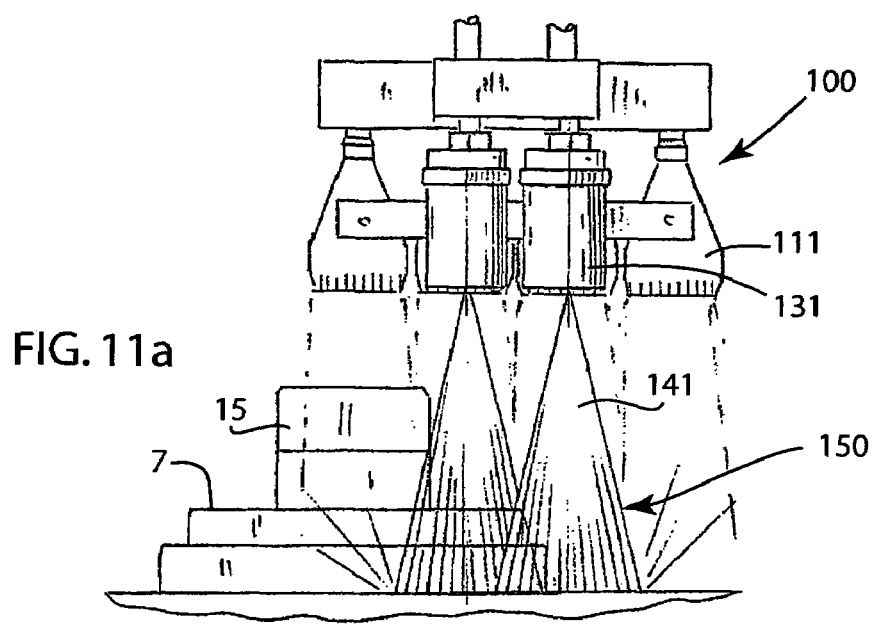
FIG. 11 is a side view of FIG. 10 showing the nozzle spray aligned normal and in close proximity to the surface being cleaned.

The object 5 is now ready to be cleaned by the robotic arm 200 and end effector 100 to substantially completely remove the oil and grease from its surfaces. The air system for nozzles 111 is turned off. The water system 300 continues to supply water at about 3,000 psi to the inlets 134 of water spray nozzles 131. The robotic arm 200 then programmably moves the end effector 100 to a start position with the nozzle heads 131 positioned about eight inches from an end of a first particular surface 7a–e based on the predetermined coordinates 55, and articulates the end effector 100 so that its direction of aim 106 is substantially normal to this surface. The robotic arm 200 then programmably moves the end effector 100 along a path of travel along this surface while maintaining its direction of aim 106 substantially normal to this surface and maintaining its eight inch stand off distance. The effective working region 152 of the spray pattern 150 remains in contact with this surface. The path of travel is programmed to closely follow the contour of the surface. The path of travel can be linear as when cleaning a side 7b–e of the transmission pan 5 shown in FIG. 10, or can be arcuate as when cleaning around the conical outer surface 30 of the transmission housing 25 shown in FIG. 4. When the width of the spray pattern 150 is wider than the surface being cleaned, such as surface 7b–e, only one pass along that surface is needed. When the width of the spray pattern 150 is narrower than the surface being cleaned, such as surface 30, then the robotic arm 200 programmably moves along one or more similar paths of travel, each being spaced about one spray width from and parallel to the previous path of travel. The robotic arm 200 continues to maintain its direction of aim 106 substantially normal to this surface and maintain its eight inch stand off distance. This process is performed for each particular surface that is to be cleaned.

When the robotic arm 200 and end effector 100 comes to a recess 10 or 38 or a projection 15 or 40 in the particular surface 7a or 30 being cleaned, the robotic arm 200 programmably articulates the end effector 100 and spray 150 to a direction of aim 106 normal to one of the walls formed by that recess or projection as shown in FIG. 12. The robotic arm 200 programmably articulates the end effector 100 and spray 150 to clean each sidewall surface of the recess or projection.

The robotic arm 200 and end effector 100 are able to avoid a sensitive area 18, such as an area containing a sensor 19. When the robotic arm 200 is moving along a path of travel and reaches a predetermined location in front of the sensitive area, the robotic arm 200 programmably articulates the end effector 100 to rotate the direction of aim 106 of the spray pattern 150 out of its normal alignment and away from contact with sensitive area so that the spray pattern 150 does not contact the sensitive area. This articulation is done while the arm 200 continuously moves along its path of travel. After the robotic arm 200 moves to a predetermined location past the sensitive area, the arm programmably articulates the direction of aim 106 of the end effector 100 back normal to the surface being cleaned.

The robotic arm 200 can also be programmed to move the end effector 100 close to a particularly difficult to clean surface or area of the item. The robotic arm 200 articulates the direction of aim 106 of the end effector 100 normal to this surface or area, and positions the end effector 100 close enough to the surface that the ultra high-pressure 145 or very high-pressure 146 regions of a particular spray 141 impact the desired difficult to clean area. The robotic arm 200 then moves along a path of travel to clean the difficult area. If the difficult area is particularly small, the robotic arm may simply articulate the spray 141 to clean the area. If the difficult area is particularly large so that the width of the spray 141 is narrower than the difficult area, then the robotic arm 200 programmably moves along one or more similar paths of travel, each being spaced about one spray 141 width of the selected region 145 or 146 from and parallel to the previous path of travel. The robotic arm 200 continues to maintain its direction of aim 106 substantially normal to this surface and maintain its desirably close stand off distance.

Figure 4:
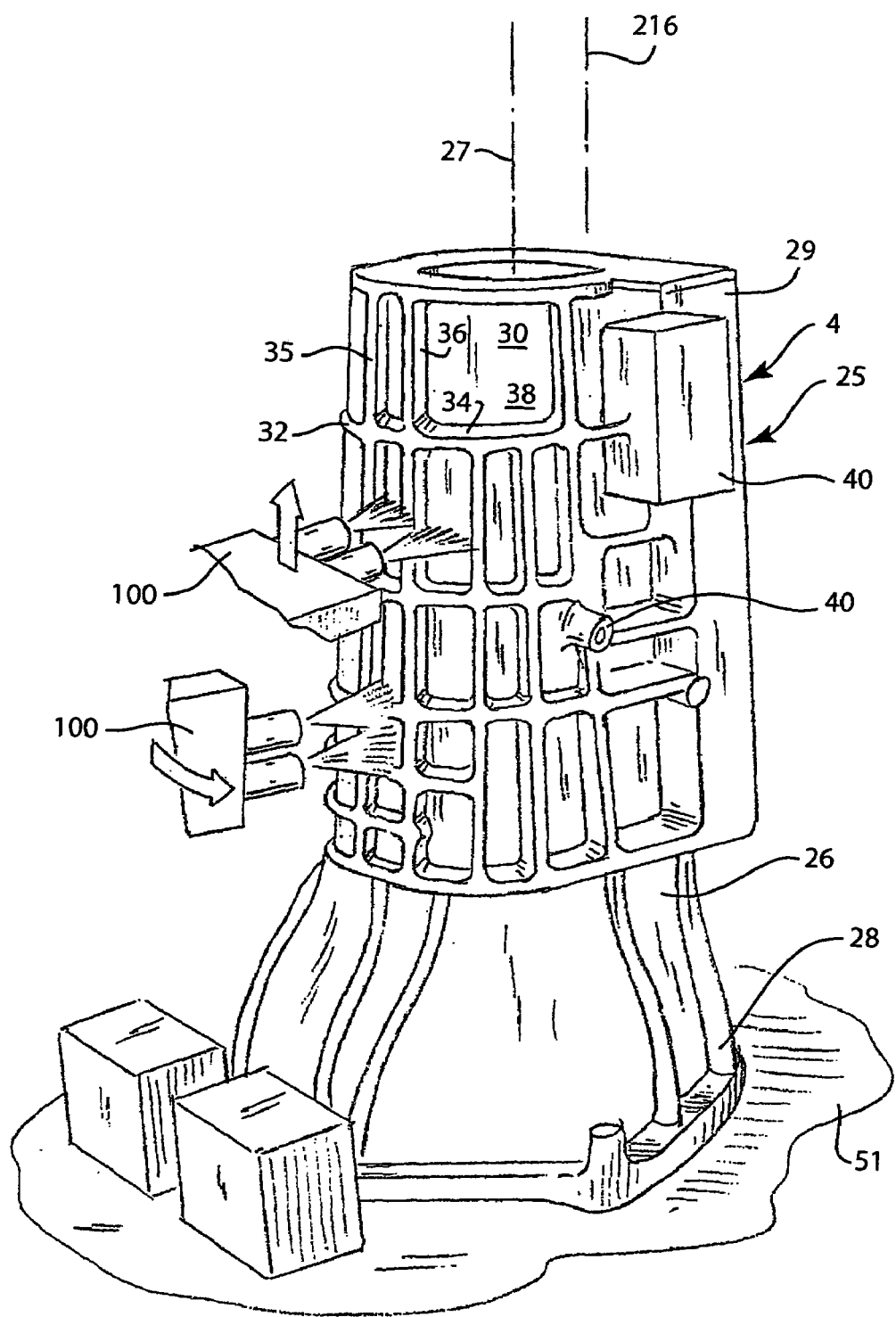
FIG. 4 is a perspective view of the present invention cleaning a transmission housing having a body with generally conical shape, a number of axial and longitudinally extending ribs or flanges projecting from the surface of the body, and a sensor.

The surfaces of an object with offset parallel surfaces, such as the transmission housing 25 in FIG. 4, can be cleaned relatively quickly by the end effector 100 and robotic arm 200. This is because the effective cleaning area 152 of the spray pattern 150 has a depth of about two inches. The outer surface 30 of the housing is extensively covered by and array of axial and longitudinal rims 32 and 35. The outer ends of the ribs 32 and 35 are parallel to and offset about one-half inch from the outer surface 30. The robotic arm 200 can be programmed to position the end effector 100 so that the nozzle heads 135 are about eight inches from the ends of the ribs 32 and 35 and about 8½ inches from the outer surface 30, and articulate the end effector so that its direction of aim 106 is normal to both of the parallel offset the surfaces. The robotic arm 200 can then programmably move the end effector 100 along an arcuate path of travel around the circumference of the housing 25, or along a linear path of travel along the height of the housing, while simultaneously maintaining its aim 106 normal to both of these parallel offset surface to simultaneously clean both surfaces in a single pass. The sidewall surfaces 33, 34, 36 and 37 of the housing are cleaned via separate passes similar to that shown in FIG. 4.

The robotic wash cell 50 is able to clean the various surfaces of the object 4 by programming the six axis robotic arm 200 to move and articulate the end effector 100 through multiple paths of travel while maintaining the end effector in close proximity to the these various surfaces and maintaining the aim 106 of the end effector and spray 141 and 150 normal to these surfaces. In this way the wash cell 50 is able to substantially completely clean or remove any oil or grease contaminant from the various surfaces of objects having even complex shapes. Although microscopic amounts of oil or grease particles may remain, the surfaces of the object 4 are completely clean or free of any oil or grease when subjected to a close visual examination, and the presence of oil or grease is undetectable to the touch.

The robotic wash cell 50 can also be used to debur the edges of the object 4. The wash end effector 100 is removed and the debur end effector 170 is rigidly mounted to the robotic arm 200. The air system remains off and water system 300 is adjusted to supply water at about 6,000 psi to the inlet 184 of nozzle 181. The robotic arm 200 then programmably moves the end effector 170 to a start position about two to six inches from an edge formed by two adjacent surfaces of the item 5 based on the predetermined coordinates 55 of the item, and articulates the end effector 170 so that its direction of aim 106 is substantially normal to one of these surfaces. The robotic arm 200 then programmably moves the end effector 100 along a path of travel along this surface while maintaining its direction of aim 106 substantially normal to this surface and maintaining its two to six inch stand off distance. The effective working region of the spray 195 remains in contact with this surface and its edges. The path of travel is programmed to closely follow the contour of the surface. The path of travel can be linear as when deburring the edges of the surfaces 7 of the transmission pan 5 shown in FIG. 2, or can be arcuate as when deburring the edges of the conical surfaces of the ribs 32 and 35 of the transmission housing 25 shown in FIG. 4. When the edges are relatively far apart as with pan 5, only one edge can be deburred in a single pass. When several edges are relatively close together, and the width of the spray 195 is narrower than the entire span of edges as with housing 25, then the robotic arm 200 programmably moves along one or more similar paths of travel, each being spaced about one spray width from and parallel to the previous path of travel. The robotic arm 200 continues to maintain its direction of aim 106 substantially normal to the various surfaces and maintain its two to six inch stand off distance from their corresponding edges. This process is performed for each particular edge that is to be deburred.

While the invention has been described with reference to a preferred embodiment, it will be understood by those skilled in the art that various changes may be made and equivalents may be substituted without departing from the broad aspects of the invention.

I claim:

1. An end effector for a robotic arm for spraying a high-pressure fluid, said end effector comprising:
   a mounting bracket;
   a first nozzle having a head and a central axis, said nozzle being secured to said mounting bracket and positioned to align its said central axis in a direction of aim, said head being adapted to spray the fluid in a first spray along a first plane, said first plane including said central axis of said first nozzle, and said first spray having an effective cleaning region;
   a second nozzle having a head and a central axis, said nozzle being secured to mounting bracket and being positioned to align said central axis in said direction of aim, said central axis of said second nozzle being spaced apart from and substantially parallel to said central axis of said first nozzle, said head being adapted to spray the fluid in a second spray along a second plane, said second plane including said central axis of said second nozzle, and said second spray having an effective cleaning region; and,
   wherein said first and second sprays combine to form a spray pattern having a continuous effective cleaning zone, said sprays forming an area of overlap in said zone, said first and second planes being offset to space said sprays apart in said continuous effective cleaning zone, said sprays remaining apart in said area of overlap.

2. The end effector of claim 1, and wherein said first and second sprays are parallel.

3. The end effector of claim 2, and wherein said first and second sprays are dispersing sprays.

4. The end effector of claim 3, and wherein said first and second dispersing sprays have a fan shape.

5. The end effector of claim 4, and wherein said continuous effective cleaning zone is between about eight to ten inches from said heads of said nozzles.

6. The end effector of claim 1, and wherein each of said first and second sprays are dispersing sprays, each dispersing spray having an ultra high-pressure area, a very high-pressure area and an effective high-pressure cleaning area, and said effective high-pressure cleaning areas forming said continuous effective cleaning zone.

7. The end effector of claim 6, and wherein said spray pattern has multiple zones that include a discontinuous inner zone having a gap between said dispersing sprays, said continuous effective cleaning zone, and an outer zone where said dispersing spray pattern falls below a desired pressure limit.

8. The end effector of claim 1, and wherein said fluid is pure water.

* * * * *